US012747951B2

(12) United States Patent
Suzuki et al.

(10) Patent No.: US 12,747,951 B2
(45) Date of Patent: Sep. 29, 2026

(54) INFORMATION PROCESSING DEVICE, CONTROL METHOD, PROGRAM, AND STORAGE MEDIUM INCLUDING ACQUIRING POINT CLOUD MAP DATA

(71) Applicants: PIONEER CORPORATION, Tokyo (JP); PIONEER SMART SENSING INNOVATIONS CORPORATION, Tokyo (JP)

(72) Inventors: Masami Suzuki, Saitama (JP); Masahiro Kato, Saitama (JP)

(73) Assignees: PIONEER CORPORATION, Tokyo (JP); PIONEER SMART SENSING INNOVATIONS CORPORATION, Tokyo (JP)

( * ) Notice: Subject to any disclaimer, the term of this patent is extended or adjusted under 35 U.S.C. 154(b) by 280 days.

(21) Appl. No.: 18/030,855

(22) PCT Filed: Oct. 6, 2021

(86) PCT No.: PCT/JP2021/036968

§ 371 (c)(1),
(2) Date: Apr. 7, 2023

(87) PCT Pub. No.: WO2022/075356

PCT Pub. Date: Apr. 14, 2022

(65) Prior Publication Data

US 2025/0085114 A1 Mar. 13, 2025

(30) Foreign Application Priority Data

Oct. 7, 2020 (JP) ................................ 2020-169915

(51) Int. Cl.

| | |
|---|---|
| ***G01C 21/28*** | (2006.01) |
| ***G01S 17/89*** | (2020.01) |
| ***G01S 17/931*** | (2020.01) |

(52) U.S. Cl.

CPC .............. *G01C 21/28* (2013.01); *G01S 17/89* (2013.01); *G01S 17/931* (2020.01)

(58) Field of Classification Search

CPC ...... G01S 17/89–90; G01S 17/00; G01S 7/00; G06T 7/70–75; G06T 7/30–38;

(Continued)

(56) References Cited

U.S. PATENT DOCUMENTS

| | | | | |
|---|---|---|---|---|
| 9,080,866 B1 * | 7/2015 | Dowdall | ................. | G01S 17/42 |
| 2010/0157280 A1 * | 6/2010 | Kusevic | ................ | G01S 7/4972 356/4.01 |

(Continued)

FOREIGN PATENT DOCUMENTS

| | | | | |
|---|---|---|---|---|
| CN | 111046735 A * | 4/2020 | ........... | G06V 20/588 |
| JP | 2013-257742 A | 12/2013 | | |

(Continued)

OTHER PUBLICATIONS

Tanaka Shinya—English Description of JP-2017004176-A via Espacenet Patent Translate, retrieved Sep. 12, 2025 (Year: 2025).*

(Continued)

*Primary Examiner* — Erin M Piateski
*Assistant Examiner* — Paul Allen
(74) *Attorney, Agent, or Firm* — Procopio, Cory, Hargeaves & Savitch LLP

(57) ABSTRACT

The information processing device includes a point cloud map data acquisition unit, a scan data acquisition unit, a scan data processing unit, and a matching unit. The point cloud map data acquisition unit is configured to acquire point cloud map data that is point cloud data whose reflection intensity is equal to or larger than a threshold value. The scan data acquisition unit is configured to acquire scan data that is point cloud data measured by receiving reflected light of emitted light. The scan data processing unit is configured (Continued)

to generate, from the scan data, high reflection intensity scan data whose reflection intensity is equal to or larger than a predetermined threshold value. The matching unit is configured to perform matching between the point cloud map data and the high reflection intensity scan data.

11 Claims, 14 Drawing Sheets

(58) Field of Classification Search
CPC ......... G06T 2207/30252–30264; G06T 17/00; G06T 7/00; G01C 21/00; B60W 2420/408; G05D 1/00
USPC .................................................. 701/461–463
See application file for complete search history.

(56) References Cited

U.S. PATENT DOCUMENTS

| | | | | |
|---|---|---|---|---|
| 2012/0081544 | A1* | 4/2012 | Wee | G01S 17/894 348/140 |
| 2017/0227647 | A1 | 8/2017 | Baik | |
| 2017/0365094 | A1* | 12/2017 | Liu | G06V 20/13 |
| 2018/0299273 | A1* | 10/2018 | Cai | G05D 1/027 |
| 2019/0101649 | A1* | 4/2019 | Jensen | G01S 17/89 |
| 2019/0163989 | A1* | 5/2019 | Guo | G06F 18/251 |
| 2020/0225032 | A1 | 7/2020 | Chen et al. | |
| 2020/0393566 | A1* | 12/2020 | Zeng | G01S 7/4808 |
| 2020/0408557 | A1* | 12/2020 | Fasola | G05D 1/0212 |
| 2021/0003712 | A1* | 1/2021 | Zhang | G06V 20/56 |
| 2021/0027501 | A1* | 1/2021 | Moss | G06T 7/11 |
| 2021/0201070 | A1* | 7/2021 | Omari | G01C 21/3635 |
| 2021/0405200 | A1* | 12/2021 | Ding | G06T 17/05 |
| 2022/0035011 | A1* | 2/2022 | Pacala | G01S 7/4865 |

FOREIGN PATENT DOCUMENTS

| | | | | |
|---|---|---|---|---|
| JP | 2017004176 A * | 1/2017 | | |
| JP | 2017-091128 A | 5/2017 | | |
| JP | 2020-034322 A | 3/2020 | | |
| WO | WO-2016002776 A1 * | 1/2016 | G01V 8/12 | |
| WO | 2018/221455 A1 | 12/2018 | | |

OTHER PUBLICATIONS

L. Chen, J. Yang and H. Kong, "Lidar-histogram for fast road and obstacle detection," 2017 IEEE International Conference on Robotics and Automation (ICRA), Singapore, 2017, pp. 1343-1348, (Year: 2017).*

Shimbo, Kenichi—English description of WO-2016002776-A1, via Google Patents, Jan. 23, 2026 (Year: 2026).*

Li, Kuang-Yu—English description of CN-111046735-A via Espacenet Patent Translate, retrieved Jun. 1, 2026 (Year: 2026).*

Yoneda, et al., "Urban Road Localization by using Multiple Layer Map Matching and Line Segment Matching", 2015 IEEE Intelligent Vehicles Symposium (IV), Jun. 28-Jul. 1, 2015, COEX, Seoul, Korea, in 6 pages.

Fu, et al., "An Efficient Scan-to-Map Matching Approach Based on Multi-channel Lidar", J Intell Robot Syst (2018) 91: 501-513, https://doi.org/10.1007/s10846-017-0717-0, dated Oct. 19, 2017, in 13 pages.

European Patent Office, Extended European Search Report, Application No. 21877655.7, dated Oct. 10, 2024, in 10 pages.

Takai, et al., Accurate Registraton of MMS Point Clouds of Urban Areas Using Trajectory, ISPRS Annals of the Photogrammetry, Remote Sensing and Spatial Information Sciences, vol. II-5/W2, 2013 ISPRS Workshop Laser Scanning 2013, Nov. 11-13, 2013, Antalya, Turkey.

Seki, et al., Recognition of the Road Object in 3D Road Data, the Institute of Electronics, Information and Communication Engineers, Nov. 10, 2021, in 6 pages.

Patent Cooperation Treaty, International Search Report, Application No. PCT/JP2021/036968, dated Nov. 9, 2021, in 4 pages.

* cited by examiner

INFORMATION PROCESSING DEVICE, CONTROL METHOD, PROGRAM, AND STORAGE MEDIUM INCLUDING ACQUIRING POINT CLOUD MAP DATA

CROSS-REFERENCE TO RELATED APPLICATIONS

This application is US National Stage of International Patent Application PCT/JP2021/036968, filed Oct. 6, 2021, which claims benefit of priority from Japanese Patent Application JP2020-169915, filed Oct. 7, 2020, the contents of both of which are incorporated herein by reference.

TECHNICAL FIELD

The present disclosure relates to an estimation technique for estimating the state of a vehicle.

BACKGROUND ART

Conventionally, techniques for estimating a position of a vehicle based on measurement data from a measurement unit such as a radar or a camera are known. For example, Patent Literature 1 discloses a technique for estimating a self-position by matching the output from a measurement sensor with position information of feature(s) registered in advance on the map. Further, Non-Patent Literature 1 discloses a position estimation method based on the ICP (Iterative Closest Point) matching in which a Point to Point algorithm and a Point to Plane algorithm are combined.

PRIOR ART DOCUMENTS

Patent Literature

Patent Literature 1: JP 2013-257742A

Non-Patent Literature

Non-Patent Literature 1: S. Takai, H. Date, S. Kanai, Y. Niina, K. Oda, and T. Ikeda: Accurate registration of MMS point clouds of urban areas using trajectory, ISPRS Annals of the Photogrammetry, Remote Sensing and Spatial Information Sciences, Volume II-5/W2, pp. 277-282. 2013.

SUMMARY

Problem to be Solved by the Invention

In an environment in which there are few objects having characteristic three-dimensional structures in a place where measurement data is acquired, the acquired measurement data does not include enough characteristic shape information for stable matching, which makes it difficult to perform matching between the map data and the measurement data with high accuracy. As a result, there is an issue that errors in position and posture could occur in the position-and-posture estimation process of the own vehicle.

The present disclosure has been made in order to solve the above issues, and it is an object of the present invention to provide an information processing device suitably capable of performing the matching between the map data and the measurement data.

Means for Solving the Problem

One invention is an information processing device including:

- a point cloud map data acquisition unit configured to acquire point cloud map data that is point cloud data whose reflection intensity is equal to or larger than a threshold value:
- a scan data acquisition unit configured to acquire scan data that is point cloud data measured by receiving reflected light of emitted light;
- a scan data processing unit configured to generate, from the scan data, high reflection intensity scan data whose reflection intensity is equal to or larger than a predetermined threshold value; and
- a matching unit configured to perform matching between the point cloud map data and the high reflection intensity scan data.

Another invention is a control method executed by a computer, the control method including:

- acquiring point cloud map data that is point cloud data whose reflection intensity is equal to or larger than a threshold value;
- acquiring scan data that is point cloud data measured by receiving reflected light of emitted light;
- generating, from the scan data, high reflection intensity scan data whose reflection intensity is equal to or larger than a predetermined threshold value; and
- performing matching between the point cloud map data and the high reflection intensity scan data.

Still another invention is a program executed by a calculation unit, the program causing the computer to:

- acquire point cloud map data that is point cloud data whose reflection intensity is equal to or larger than a threshold value;
- acquire scan data that is point cloud data measured by receiving reflected light of emitted light;
- generate, from the scan data, high reflection intensity scan data whose reflection intensity is equal to or larger than a predetermined threshold value; and
- perform matching between the point cloud map data and the high reflection intensity scan data.

DETAILED DESCRIPTION OF PREFERRED EMBODIMENTS

Figure 1:
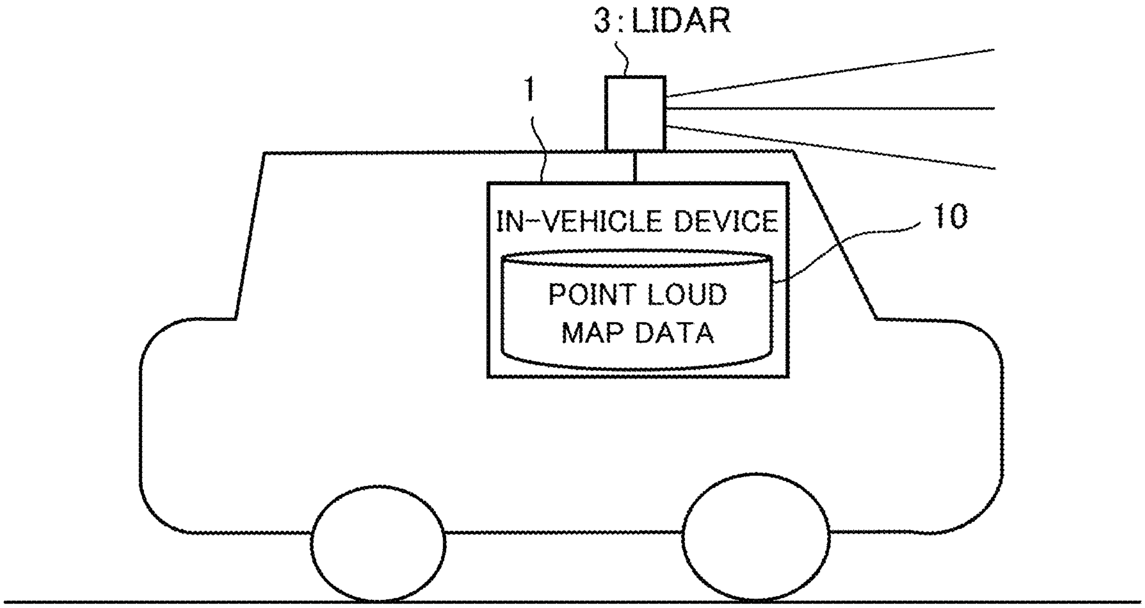
FIG. 1 It is a schematic configuration diagram of a driving support system.

According to a preferred embodiment of the present invention, the information processing device includes: a point cloud map data acquisition unit configured to acquire point cloud map data that is point cloud data whose reflection intensity is equal to or larger than a threshold value: a scan data acquisition unit configured to acquire scan data that is point cloud data measured by receiving reflected light of emitted light: a scan data processing unit configured to generate, from the scan data, high reflection intensity scan data whose reflection intensity is equal to or larger than a predetermined threshold value; and a matching unit configured to perform matching between the point cloud map data and the high reflection intensity scan data. The "threshold value" mentioned in "high reflection intensity scan data whose reflection intensity is equal to or larger than a predetermined threshold value" and the "threshold value" mentioned in "point cloud map data that is point cloud data whose reflection intensity is equal to or larger than a threshold value" are determined to be optimal values based on the property regarding the reflection intensity of the measurement device such as a lidar used to acquire the scan data and the property regarding the reflection intensity of the measurement device such as a lidar used to generate the point cloud map data, respectively. According to this mode, the information processing device utilizes scan data having a high reflection intensity to thereby perform a matching between the map data and the scan data even in an environment in which there are few objects having a three-dimensional structure.

In one mode of the information processing device, the point cloud map data acquisition unit is configured to acquire, as the point cloud map data, high reflection intensity map data that is point cloud data including points, on a reference plane, whose reflection intensity is equal to or larger than the threshold value, wherein the scan data processing unit is configured to generate, from the scan data, the high reflection intensity scan data including points, on the reference plane, whose reflection intensity is equal to or larger than the threshold value, and wherein the matching unit is configured to perform the matching between the high reflection intensity map data and the high reflection intensity scan data. According to this mode, the information processing device can suitably execute the matching based on the high reflective portion of the reference plane.

In another mode of the information processing device, the matching unit is configured to perform the matching based on a Point to Point algorithm. According to this mode, it is possible to perform the matching with high accuracy based on the highly reflective portion of the reference surface.

In still another mode of the information processing device, the point cloud map data acquisition means is configured to acquire the high reflection intensity map data and three-dimensional space map data that is point cloud data of features existing in a three-dimensional space, wherein the scan data processing means is configured to generate the scan data or data obtained by filtering the scan data as three-dimensional space scan data, and wherein the matching unit is configured to perform a first matching between the three-dimensional space map data and the three-dimensional space scan data, and a second matching between the high reflection intensity map data and the high reflection intensity scan data. According to this mode, the information processing device can suitably perform the matching by using the scan data other than the reference plane. In some embodiments, the matching unit is configured to perform the first matching based on a Point to Plane algorithm and performs the second matching based on a Point to Point algorithm.

In still another mode of the information processing device, the matching unit is configured to set weights for the first matching and the second matching based on the number of matched points of the three-dimensional space scan data in the first matching and the number of matched points of the high reflection intensity scan data in the second matching. According to this mode, the information processing device can obtain a matching result in which the first matching and the second matching are suitably combined by weighting according to the number of points to be processed.

In still another mode of the information processing device, the reference surface includes a road surface. Thus, the information processing device can suitably execute the matching between the map data and the scan data using the road marking paint as a reference even in an environment where there are few objects having a three-dimensional structure.

In still another mode of the information processing device, the scan data acquisition unit is configured to acquire the scan data measured by an external sensor that receives the reflected light of the light emitted therefrom. According to this mode, the information processing device can suitably acquire the scan data including information on the reflection intensity.

In still another mode of the information processing device, the matching unit is configured to calculate a parameter for converting a coordinate system of the scan data into a coordinate system of the point cloud map data through the matching. By performing the matching described above with high accuracy, the information processing device can calculate the parameter for converting the coordinate system of the scan data to the coordinate system of the point cloud map data with high accuracy.

In still another mode of the information processing device, the scan data processing unit is configured to set the threshold value based on a histogram of the scan data in terms of the reflection intensity. According to this aspect, the information processing device can adaptively calculate the threshold value to be used for generating the high reflection intensity scan data.

According to another preferred embodiment of the present invention, there is provided a control method executed by a computer, the control method including: acquiring point cloud map data that is point cloud data whose reflection intensity is equal to or larger than a threshold value; acquiring scan data that is point cloud data measured by receiving reflected light of emitted light; generating, from the scan data, high reflection intensity scan data whose reflection intensity is equal to or larger than a predetermined threshold value; and performing matching between the point cloud map data and the high reflection intensity scan data. By executing this control method, the information processing device can preferably perform the matching between the map data and the scan data.

According to still another preferred embodiment of the present invention, there is provided a program executed by a computer, the program causing the computer to: acquire point cloud map data that is point cloud data whose reflection intensity is equal to or larger than a threshold value; acquire scan data that is point cloud data measured by receiving reflected light of emitted light; generate, from the scan data, high reflection intensity scan data whose reflection intensity is equal to or larger than a predetermined threshold value; and perform matching between the point cloud map data and the high reflection intensity scan data. By executing this program, the computer can preferably perform the match between the map data and the scan data. In some embodiments, the program is stored in a storage medium.

EMBODIMENTS

Hereinafter, preferred embodiments of the present invention are described below with reference to drawings. It is noted that a character with "^" on its top is expressed in this specification as "A^" (where "A" is a character) for convenience.

(1) Overview of Driving Support System

FIG. 1 is a schematic configuration of a driving support system according to the present embodiment. The driving support system has an in-vehicle device 1 which moves with a vehicle which is a moving body, and a lidar (Lidar: Light Detection and Ranging, or Laser Illuminated Detection and Ranging) 3.

The in-vehicle device 1 is electrically connected to one or more external sensors such as a lidar 3 and one or more internal sensors (not shown), and estimates, based on the outputs from the sensors, the position (including posture) to be used as a reference in the driving support system. The position to be used as a reference may be a center position of the vehicle on which the in-vehicle device 1 is mounted, or may be a position of the lidar 3 to be used for position estimation. Then, the in-vehicle device 1 performs driving support such as automatic driving control of the vehicle so as to travel along the route to the set destination based on the position estimation result. The in-vehicle device 1 stores point cloud map data 10 that is map data of point cloud indicating the three-dimensional position and the reflection intensity with respect to each measured point of the surface of a road or a feature on or around the road. Then, the in-vehicle device 1 performs position estimation by performing the matching between the point cloud map data 10 and the scan data that is the measurement result generated by the lidar 3.

The lidar 3 emits pulse lasers with respect to a predetermined angular range in the horizontal and vertical directions to thereby discretely measure the distance to an object existing in the outside and generate scan data indicating a three-dimensional point cloud indicating the position of the object. In this case, the lidar 3 is equipped with a radiating unit for emitting a laser beam while changing the irradiation direction, a light receiving unit for receiving the light of the reflected laser beam (scattered light), and an output unit for outputting scan data based on the light receiving signal outputted by the light receiving unit. The scan data is generated based on the irradiation direction corresponding to the laser beam received by the light receiving unit, and the response delay time of the laser beam recognized based on the received light signal described above. The scan data to be obtained per single scanning corresponds to one frame of the scan data.

The installation position of the lidar 3 is not limited to the position shown in FIG. 1 and may be any installation position such that the irradiation range of the lidar 3 include a road surface. Further, the lidar 3 may be a plurality of lidars provided on the vehicle. The in-vehicle device 1 is an example of the "information processing device", and the lidar 3 is an example of the "external sensor".

(2) Configuration of In-Vehicle Device

Figure 2:
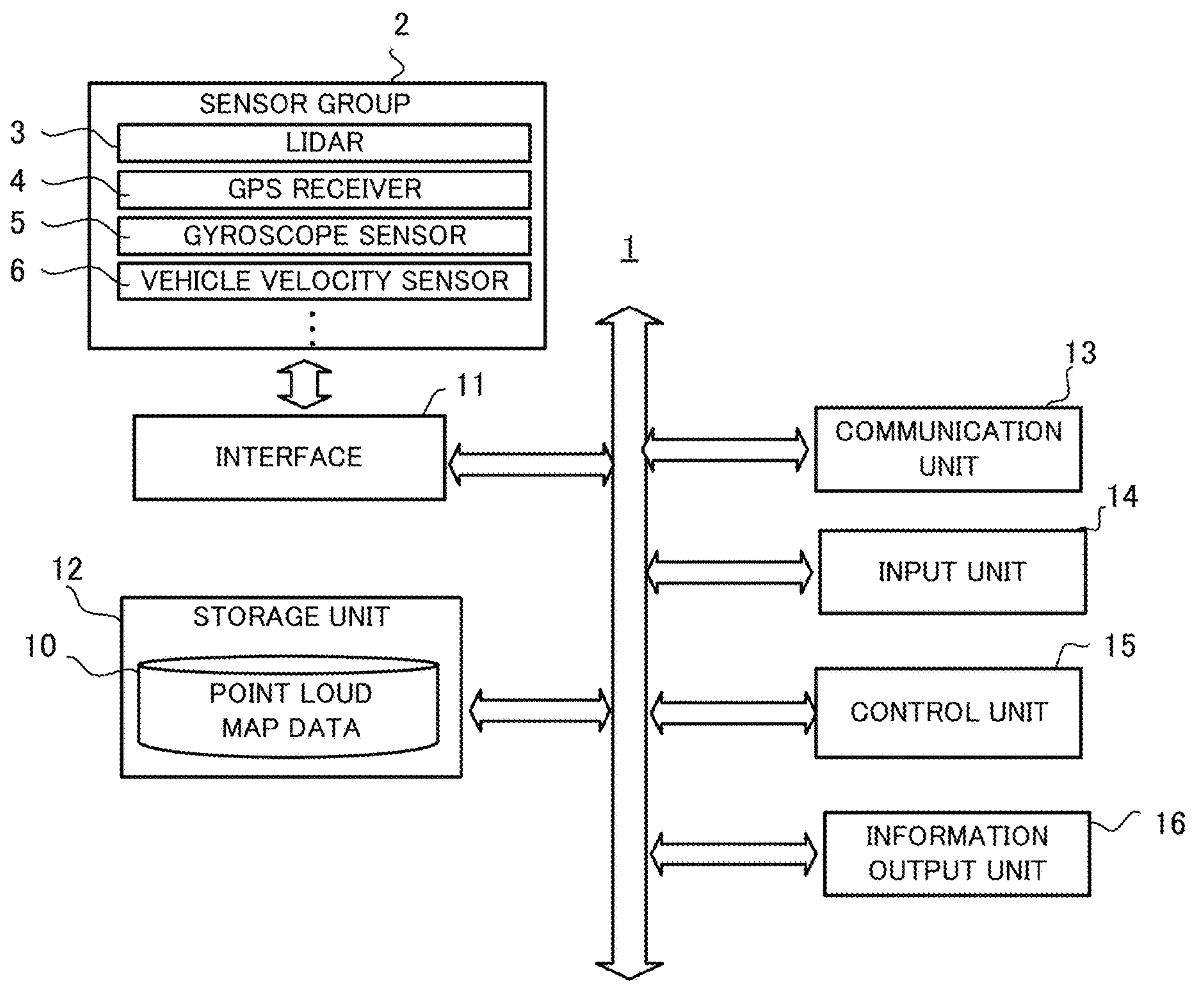
FIG. 2 It is a block diagram showing a functional configuration of the in-vehicle device.

FIG. 2 is a block diagram showing a functional configuration of the in-vehicle device 1. The in-vehicle device 1 mainly includes an interface 11, a storage unit 12, a communication unit 13, an input unit 14, a control unit 15, and an information output unit 16. Each of these components is connected to each other through a bus line.

The interface 11 functions as a hardware interface and supplies data outputted by the sensor group 2 to the control unit 15. Further, the interface 11 supplies a signal relating to the travelling control of the vehicle generated by the control unit 15 to an electronic control unit (ECU: Electronic Control Unit) of the vehicle.

The sensor group 2 includes various external sensors and internal sensors necessary for position estimation. The sensor group 2 includes a lidar 3, a GPS receiver 4, a gyroscope sensor 5, and a vehicle velocity sensor 6. The sensor group 2 may have an inertial measurement device (IMU) or the like that measures acceleration and angular velocity of the vehicle in three axial directions instead of or in addition to the gyroscope sensor 3. The sensor group 2 may further include one or more external sensors other than the lidar 3 (e.g., a camera).

The storage unit 12 stores a program to be executed by the control unit 15 and information necessary for the control unit 15 to execute a predetermined process. For example, the storage unit 12 is configured by a volatile memory and a non-volatile memory such as a RAM (Random Access Memory), a ROM (Read Only Memory), and a flash memory. In this example, the storage unit 12 stores the point cloud map data 10.

The point cloud map data 10 may be periodically updated. In this case, for example, the control unit 15 receives map data regarding the area to which the own vehicle position belongs from a server device that manages the map data via the communication unit 13 and reflects the map data in the point cloud map data 10. The point cloud map data 10 may be stored in one or a plurality of server devices capable of communicating with the in-vehicle device 1, instead of being stored in the storage unit 12. In this case, for example, the control unit 15 communicates with the server device via the communication unit 13, and acquires point cloud map data around the own vehicle position necessary for the process as necessary. The point cloud map data 10 may be data generated by the in-vehicle device 1 by SLAM (Simultaneous Localization and Mapping).

The input unit 14 is a user interface for the user to operate, such as a button, a touch panel, a remote controller, and a voice input device, and receives an input for specifying a destination for the route search, an input for specifying on or off state of the automatic operation, and the like. The information output unit 16 is, for example, a display or a speaker or the like for performing output under the control of the control unit 15.

The control unit 15 includes one or more processors, such as a CPU (Central Processing Unit) and a GPU (Graphics Processing Unit), and controls the entire in-vehicle device 1 by executing a program stored in the storage unit 12 or the like. The control unit 15 is an example of the "point cloud map data acquisition unit", the "scan data acquisition unit", the "scan data processing unit". "matching unit", and the "calculation unit" for executing a program. At least a portion of the components may be realized by any combination of hardware, firmware, and software, without being limited to being implemented by software based on a program. At least some of these components may also be implemented using user programmable integrated circuit such as a FPGA (field-programmable gate array) and a microcontroller.

(3) Position Estimation

Next, a description will be given of the position estimation to be performed by the control unit 15 of the in-vehicle device 1 by matching the scan data outputted by the lidar 3 to the point cloud map data 10.

(3-1) Outline

Schematically, the control unit 15 extracts, from the scan data outputted by the lidar 3, the scan data in the three-dimensional space, and scan data of the road surface whose reflection intensity is equal to or greater than a predetermined threshold value, respectively, and matches each scan data to the map data prepared. Thus, even in an environment in which there is no feature having a characteristic three-dimensional structure, the control unit 15 stably performs matching for the position estimation based on the scan data of the road marking paint.

In the following, the scan data in the three-dimensional space is referred to as "3D space scan data Ds1", and the scan data of the road surface whose reflection intensity is equal to or larger than the predetermined threshold value is referred to as "high reflection intensity scan data Ds2". In addition, the map data in the three-dimensional space extracted from the point cloud map data 10 for use in the matching with the 3D space scan data Ds1 is referred to as "3D space map data Dm1", and the map data of the high reflectance area (i.e. road marking paint) of the road surface extracted from the point cloud map data 10 for use in the matching with the high reflection intensity scan data Ds2 is referred to as "high reflection intensity map data Dm2".

The control unit 15 performs the above-described matching using an ICP algorithm. Here, as ICP algorithms, there are a Point to Point (P2P) algorithm in which the degree of matching between points is used as the evaluation index, and a Point to Plane (P2PL) algorithm in which the evaluation index using normal line information is used. In the present embodiment, the control unit 15 performs the above-described matching on the basis of the "Combined ICP" algorithm in which the P2P algorithm and the P2PL algorithm are combined. Specifically, the control unit 15 uses the evaluation index of the P2PL algorithm in the matching (also referred to as "first matching") between 3D space scan data Ds1 and 3D space map data Dm1 while using the evaluation index of the P2P algorithm in the matching (also referred to as "second matching") between the high reflection intensity scan data Ds2 and the high reflection intensity map data Dm2. Hereinafter, data to which other data is matched is referred to as "target," and the other data to be matched to the target is also referred to as "source".

(3-2) Block Diagram

Figure 3:
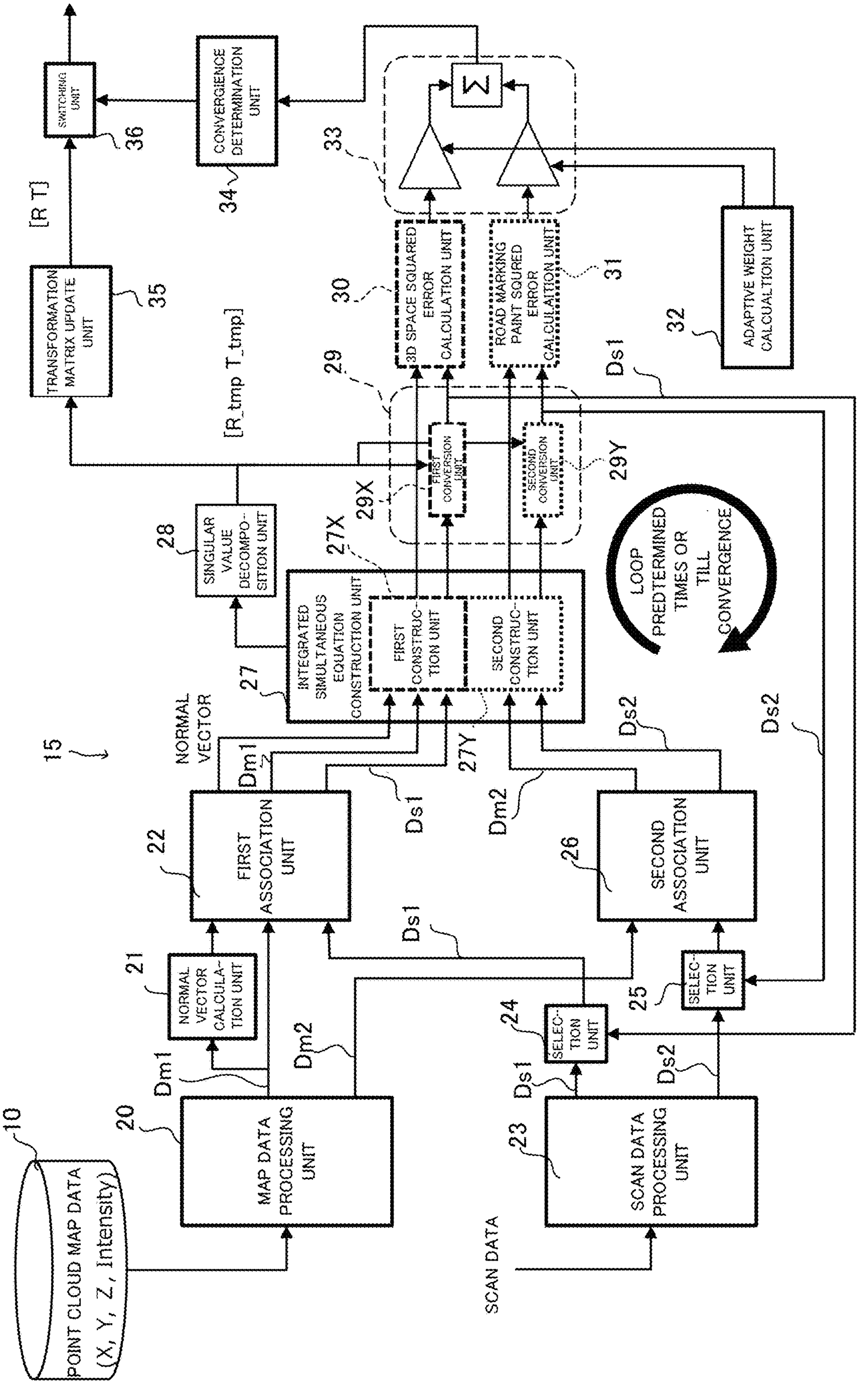
FIG. 3 It is an example of a functional block diagram of a control unit relating to the position estimation.

FIG. 3 is an example of a functional block diagram of the control unit 15 relating to the position estimation. The control unit 15 functionally includes a map data processing unit 20, a normal vector calculation unit 21, a first association unit 22, a scan data processing unit 23, a selection units 24 and 25, a second association unit 26, an integrated simultaneous equation construction unit 27, a singular value decomposition unit 28, a conversion unit 29, a 3D space squared error calculation unit 30, a high reflection intensity squared error calculation unit 31, an adaptive weight calculation unit 32, a weight addition unit 33, a convergence determination unit 34, a transformation matrix update unit 35, and a switching unit 36.

Based on the point cloud map data 10, the map data processing unit 20 generates the 3D space map data Dm1 and the high reflection intensity map data Dm2 required for the position estimation matching. The approach for generating the 3D space map data Dm1 and the high reflection intensity map data Dm2 will be described in detail in the section "(3-3) Data Process".

The normal vector calculation unit 21 calculates the normal vector required for the first matching for the respective points indicated by 3D space map data Dm1. The P2PL algorithm executed in the first matching is a method that uses the normal line information of the target, and in the first matching, the 3D space map data Dm1 corresponds to the target, and the 3D space scan data Ds1 corresponds to the source.

The first association unit 22 associates the 3D space map data Dm1 with the 3D space scan data Ds1. In this instance, the first association unit 22 searches for the nearest point (nearest neighbor point) in 3D space map data Dm1 with respect to each point included in the 3D space scan data Ds1. Then, the first association unit 22 supplies the 3D space map data Dm1 and the 3D space scan data Ds1 whose points are associated with each other, and the information on the normal vector to the integrated simultaneous equation construction unit 27.

The scan data processing unit 23 performs predetermined process on the scan data generated by the lidar 3, and generates the 3D space scan data Ds1 and the high reflection intensity scan data Ds2. In this instance, for example, for each cycle (frame cycle) of the scanning performed by the lidar, the scan data processing unit 23 performs a process of generating the 3D space scan data Ds1 and the high reflection intensity scan data Ds2 from the latest frame of the scan data. The approach for generating the 3D space scan data Ds1 and the high reflectance scan data Ds2 will be described later.

Here, the scan data generated by the lidar 3 has a coordinate system with reference to the lidar 3. Therefore, for example, based on the information regarding the installation position of the lidar 3 stored in the storage unit 12 and the vehicle position tentatively estimated based on the output signal from the sensor group 2 other than the lidar 3, the scan data processing unit 23 may tentatively convert the scan data into the data in the map coordinate system employed in the point cloud map data 10. In this instance, the scan data processing unit 23 generates the 3D space scan data Ds1 and the high reflection intensity scan data Ds2 which are expressed in the map coordinate system.

The selection unit 24 selects either the 3D space scan data Ds1 generated by the scan data processing unit 23 or the 3D space scan data Ds1 into which the present frame of the scan data is tentatively converted by the conversion unit 29 in the previous loop process. Then, the selection unit 24 supplies the selected 3D space scan data Ds1 to the first association unit 22.

Specifically, the selection unit 24 supplies the 3D space scan data Ds1 supplied from the scan data processing unit 23 to the first association unit 22 if the loop number "i" of the loop process (also called "ICP loop process") for the ICP on the frame of the scan data to be processed indicates the first time (i.e., i=1). On the other hand, if the ICP loop process is the second or subsequent time (i.e., i>1) and the termination condition of the ICP loop process is not satisfied, the selection unit 24 supplies the 3D space scan data Ds1 after the conversion by the converting unit 29 to the association unit 22. In this case, for example, the termination condition of the ICP loop process is satisfied when the ICP loop process is executed a predetermined number of times or when the ICP loop process is converged. The determination of the termination condition of ICP looping process is performed by the convergence determination unit 34 to be described later.

The selection unit 25 selects either the high reflection intensity scan data Ds2 generated by the scan data processing unit 23 or the high reflection intensity scan data Ds2 after the tentative conversion by the conversion unit 29 in the previous loop process on the present frame of the scan data. Then, the selection unit 25 supplies the selected high reflection intensity scan data Ds2 to the second association unit 26. Specifically, if the loop number i of the ICP looping process indicates the first time (i.e., i=1), the selection unit 25 supplies the high reflection intensity scan data Ds2 supplied from the scan data processing unit 23 to the second association unit 26. On the other hand, if the ICP loop process is the second or subsequent time (i.e., i>1) and the termination condition of the ICP loop process is not satisfied, the selection unit 25 supplies the 3D space scan data Ds1 after the conversion by the converting unit 29 to the second association unit 26.

The second association unit 26 associates the high reflection intensity map data Dm2 supplied from the map data processing unit 20 with the high reflection intensity scan data Ds2 supplied from the selection unit 25. In this instance, the second association unit 26 searches for the nearest point (nearest neighbor point) in the high reflection intensity map data Dm2 with respect to each point included in the high reflection intensity scan data Ds2. Then, the second association unit 26 supplies the high reflection intensity map data Dm2 and the high reflection intensity scan data Ds2 associated with respect to each point to the integrated simultaneous equation construction unit 27.

The integrated simultaneous equation construction unit 27 constructs the simultaneous equations necessary in the first matching and the second matching. The integrated simultaneous equations construction unit 27 includes a first construction unit 27X and a second construction unit 27Y. The first construction unit 27X constructs simultaneous equations (also referred to as "first simultaneous equations") regarding the first matching based on the information supplied from the first association unit 22. The second construction unit 27Y builds simultaneous equations (also referred to as "second simultaneous equations") regarding the second matching based on the information supplied from the second association unit 26. Then, the integrated simultaneous equation construction unit 27 constructs simultaneous equations (also referred to as "integrated simultaneous equations") into which the first simultaneous equations and the second simultaneous equations are integrated, and supplies the constructed integrated simultaneous equations to the singular value decomposition unit 28.

The singular value decomposition unit 28 calculates the solution of the integrated simultaneous equations supplied from the integrated simultaneous equation construction unit 27 by singular value decomposition. The solution of the integrated simultaneous equations contains the parameters of a transformation matrix to be applied to the 3D space scan data Ds1 and the high reflection intensity scan data Ds2, respectively. The transformation matrix includes a rotation matrix "R" and a translation vector "T", which is hereinafter also referred to as "[R T]". The transformation matrix that the singular value decomposition unit 28 calculates in each loop is a tentative transformation matrix, and the transformation matrix that is calculated in one loop is referred to as "tentative transformation matrix", and the rotation matrix and the translation vector of the tentative transformation matrix are referred to as "R_tmp" and "T_tmp", respectively.

The conversion unit 29 converts the 3D space scan data Ds1 and the high reflection intensity scan data Ds2 on the basis of the tentative transformation matrix calculated by the singular value decomposition unit 28. The conversion unit 29 includes a first conversion unit 29X for converting 3D space scan data Ds1, and a second conversion unit 29Y for converting the high reflection intensity scan data Ds2. The first conversion unit 29X supplies the converted 3D space scan data Ds1 to the selection unit 24 and 3D space squared error calculation unit 30, respectively, and the second conversion unit 29Y supplies the high reflection intensity scan data Ds2 after the conversion to the selection unit 25 and the high reflection intensity squared error calculation unit 31.

The 3D space squared error calculation unit 30 calculates the squared error (also referred to as "3D space squared error $E_{PT\_PL}$") between the 3D space scanned data Ds1 after the conversion by the first conversion unit 29X and the 3D space map data Dm1. The high reflection intensity squared error calculation unit 31 calculates the squared error (also referred to as "high reflection intensity squared error $E_{PT\_PT}$") between the high reflection intensity scan data Ds2 after the conversion by the second conversion unit 29Y and the high reflection intensity map data Dm2.

The adaptive weight calculation unit 32 calculates the weights to be applied to 3D space squared error $E_{PT\_PL}$ and the high reflection intensity squared error $E_{PT\_PT}$, respectively. For example, the adaptive weight calculation unit 32 determines the above-described weights on the basis of the ratio of the number of the points processed in the first matching and the second matching in the target frame to be processed. For example, provided that "N1" denotes the number of the points processed in the first matching (i.e., the number of points included in 3D space scan data Ds1), "N2" denotes the number of the points processed in the second matching (i.e., the number of points included in the high reflection intensity scan data Ds2), "w1" denotes the weight for the 3D space squared error $E_{PT\_PL}$, and "w2" denotes the weight for the high reflection intensity squared error $E_{PT\_PT}$, the adaptive weight calculation unit 32 calculates the weight w1 and the weight w2 for each frame on the basis of the following equations:

$$w1 = N1/(N1+N2),$$

$$w2 = 1-(N1/(N1+N2)).$$

The weight addition unit 33 uses the weights w1 and w2 calculated by the adaptive weight calculation unit 32 to calculate the total error "$E_{_total}$" corresponding to the weighted sum of the 3D space squared error and the high reflection intensity squared error, as shown in the following equation.

$$E_{\_total} = w1 \cdot E_{PT\_PL} + w2 \cdot E_{PT\_PT}$$

The convergence determination unit 34 determines whether or not the termination condition of the ICP loop process is satisfied, by making a determination such as convergence of the ICP loop process. Specifically, if the ICP loop process is executed a predetermined number of times in the current frame or the difference between the total error $E_{_total}$ in the current loop and the total error $E_{_total}$ in the previous loop is within a predetermined difference, the convergence determination unit 34 determines that the termination condition of the ICP loop process is satisfied. Then, the convergence determination unit 34 supplies the determination result to the switching unit 36.

The transformation matrix update unit 35 calculates a transformation matrix representing the cumulative rotation and translation in the present frame based on the tentative transformation matrix that is calculated by the singular value decomposition unit 28 in each loop of the ICP loop process.

The switching unit 36 detects the end of the ICP loop process based on the determination result supplied from the convergence determination unit 34, and then outputs the transformation matrix supplied from the transformation matrix update unit 35 as a transformation matrix to be obtained. Then, based on the transformation matrix outputted by the switching unit 36, the in-vehicle device 1 recognizes the position of the lidar 3 in the map coordinate system (including the posture). In the case where the installation information indicating the relative position (including the posture) between the vehicle and the lidar 3 is stored in the storage unit 12 or the like, the in-vehicle device 1 may estimate the position of the vehicle based on the installation information and the transformation matrix described above.

(3-3) Processing Flow

Figure 4:
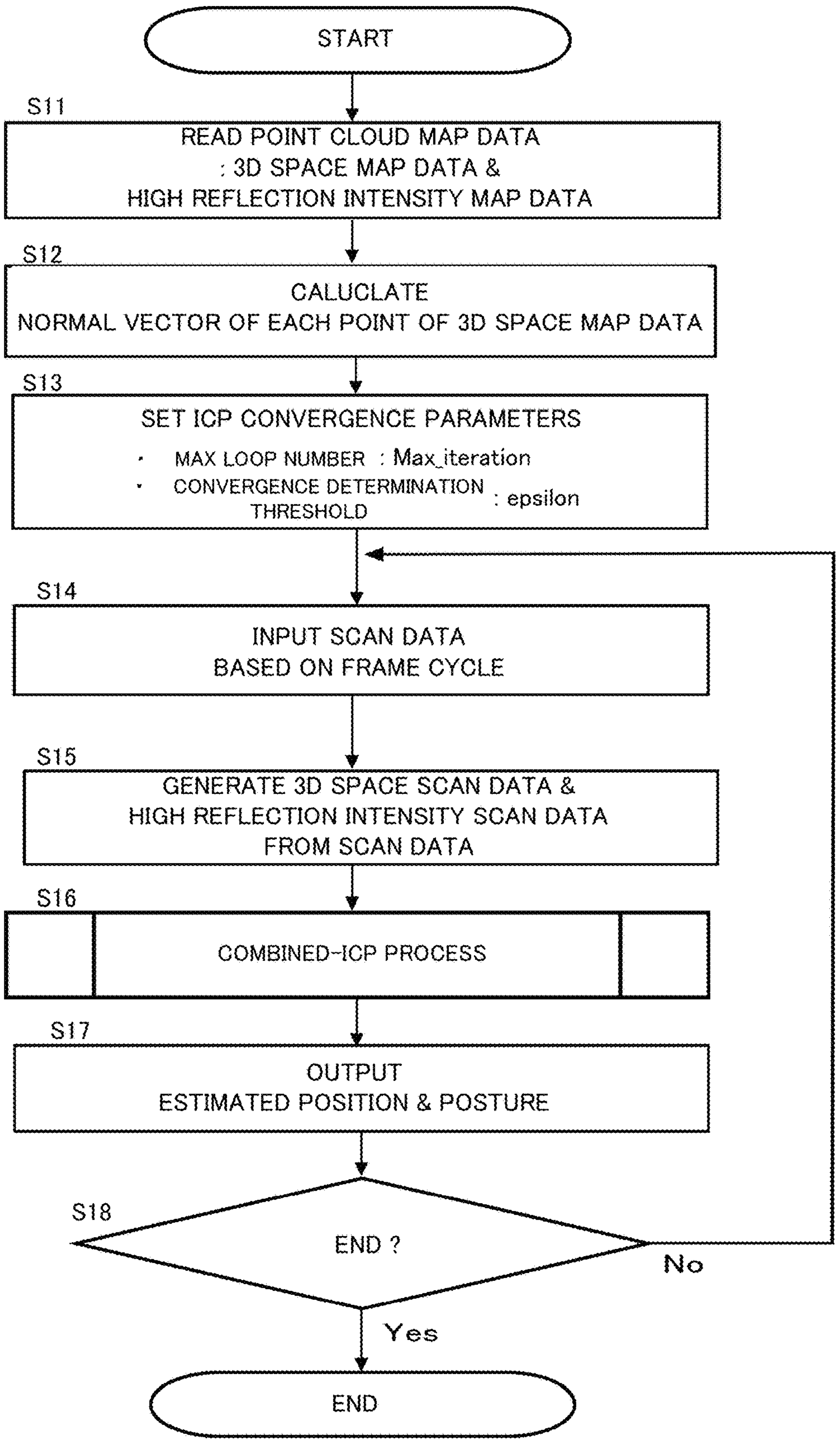
FIG. 4 It is an example of a flowchart showing a procedure of the position estimation process.

FIG. 4 is an example of a flowchart illustrating a procedure of the position estimation process in the present embodiment. For example, the control unit 15 of the in-vehicle device 1 repeatedly executes the processing of the flowchart shown in FIG. 4 for each frame cycle of the scan data.

First, the control unit 15 reads the point cloud map data 10 (step S11). Thus, the control unit 15 acquires the 3D space map data Dm1 and the high reflection intensity map data Dm2. In this instance, the control unit 15 may refer to the point cloud map data 10 in which the 3D space map data Dm1 is distinguishable from the high reflection intensity map data Dm2 or may generate the 3D space map data Dm1 and the high reflection intensity map data Dm2 from the point cloud map data 10 by a technique to be described later in the section "(3-5) Map Data Process".

Next, the control unit 15 calculates the normal vector of each point of the 3D space map data Dm1 (step S12). Furthermore, the control unit 15 sets the parameters (ICP convergence parameters) to be used for convergence determination of the ICP loop process (step S13). Here, the control unit 15 sets the maximum loop number "Max_iteration", and the convergence determination threshold value "epsilon" as the ICP convergence parameters. The process at step S11 to step S13 corresponds to the initialization process of the system.

Next, the control unit 15 accepts the input of the scan data for each frame cycle (step S14). In this instance, the control unit 15 acquires scan data generated by the lidar 3 on a frame-by-frame basis and executes the process at step S15 to step S17. Then, the control unit 15 generates the 3D space scan data Ds1 and the high reflection intensity scan data Ds2 from the scan data inputted at step S14 (step S15).

Next, the control unit 15 executes the Combined-ICP process (step S16). Detailed description of the Combined-ICP process will be specifically described with reference to the flowchart in FIG. 5. Then, the control unit 15 outputs the information regarding the estimated position and posture obtained in the Combined-ICP process at step S16 (step S17). The information regarding the estimated position and posture, for example, is supplied to a processing unit configured to perform driving support such as autonomous driving and route guidance.

Figure 5:
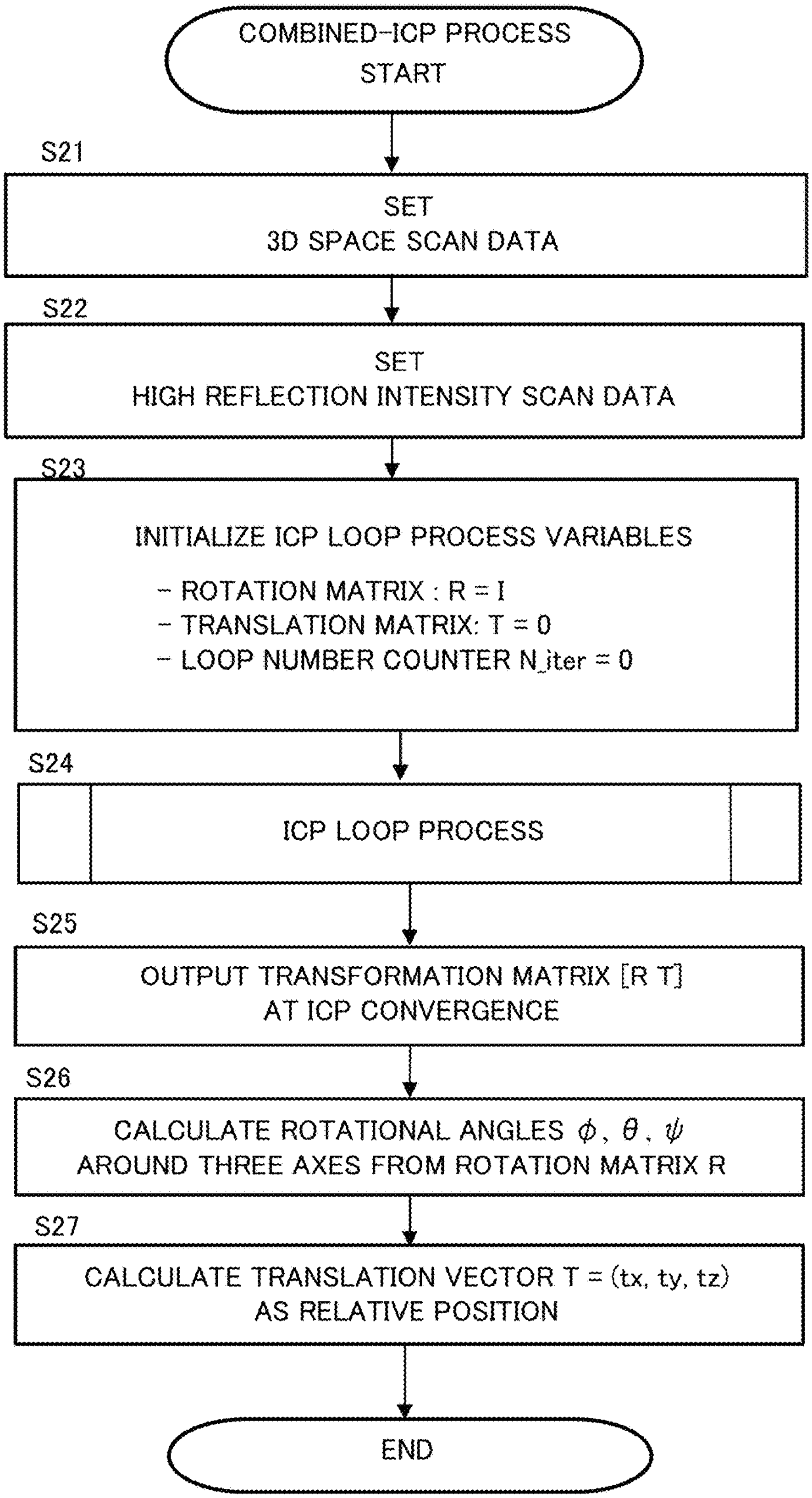
FIG. 5 It is an example of a flowchart showing a procedure of the Combined-ICP process.

FIG. 5 is an example of the flowchart showing the Combined-ICP process at step S16.

First, the control unit 15 sets the 3D space scan data Ds1 (step S21). Further, the control unit 15 sets the high reflection intensity scan data Ds2 (step S22). Then, the control unit 15 initializes the variables (ICP loop process variables) to be used in the ICP loop process (step S23). Specifically, the rotation matrix R and the translation vector, which are components of the transformation matrix to be obtained, are respectively set to "R=I", "T=0", and the loop number counter "N_iter" is set to "0".

Then, the control unit 15 executes the ICP loop process (step S24). A detailed description of the ICP loop process will be described with reference to FIG. 6.

Then, the control unit 15 outputs the transformation matrix [R T] at the time of the convergence of the ICP (step S25). Then, based on the rotation matrix R outputted at step S25, the control unit 15 calculates the rotational angles "φ", "θ", and "Ψ" around three axes representing the posture of the lidar 3 in the map coordinate system employed in the point cloud map data 10 (step S26). Furthermore, the control unit 15 calculates the translation vector "T=(tx, ty, tz)" representing the relative position of the lidar 3 (step S27). Thereby, the relative positional relation between the origin of the map coordinate system and the origin of the lidar coordinate system which the lidar 3 uses as a reference is identified.

Figure 6:
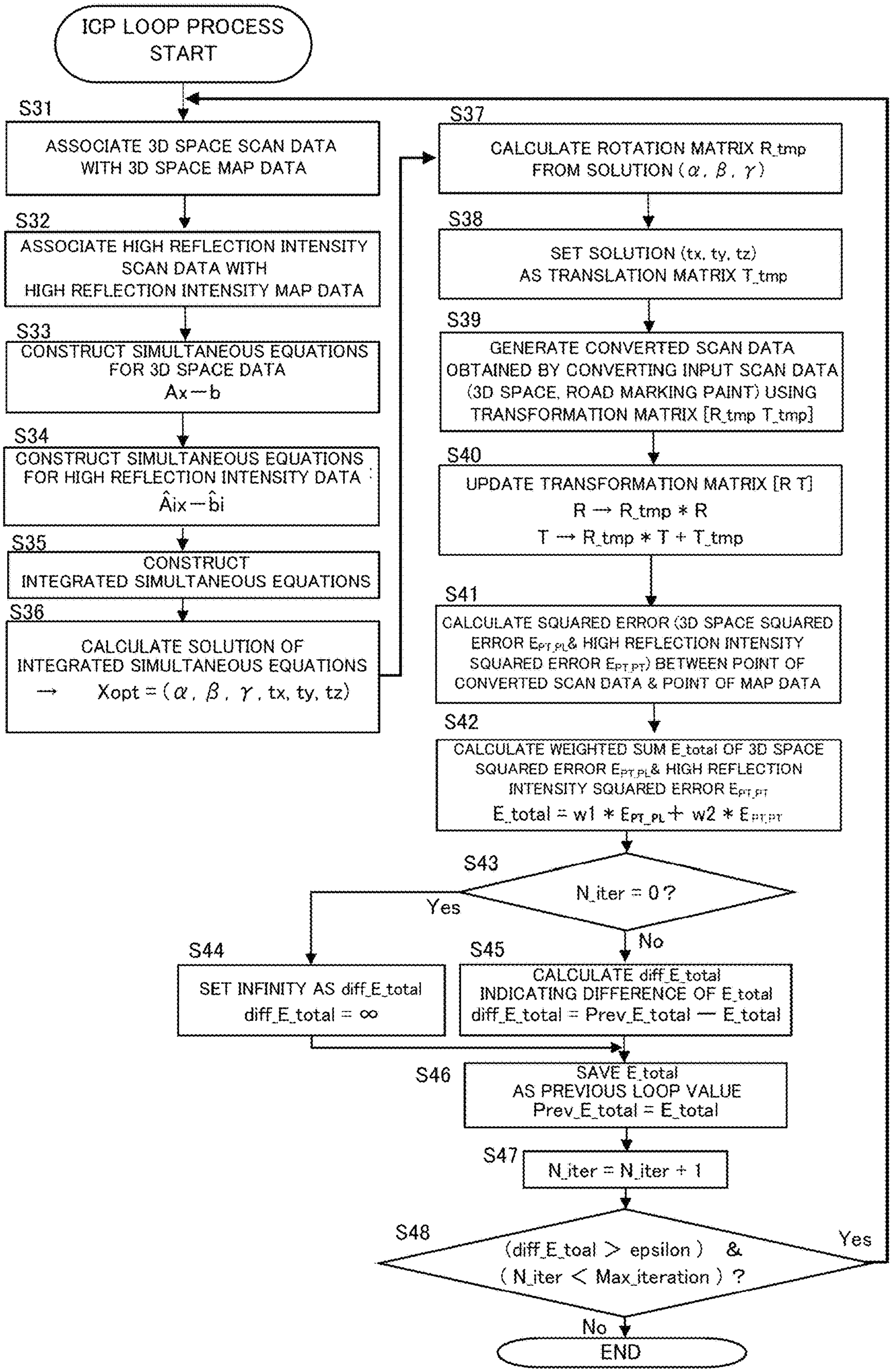
FIG. 6 It is an example of a flowchart showing a procedure of the ICP loop process.

FIG. 6 is an example of the flowchart showing the procedure of the ICP loop process executed at step S24.

First, the control unit 15 associates the 3D space scan data Ds1 with the 3D space map data Dm1 (step S31). In this instance, the control unit 15 searches for the nearest neighbor point in 3D space map data Dm1 with respect to each point included in 3D space scan data Ds1 using any search algorithm such as a KD-Tree. Next, the control unit 15 associates the high reflection intensity scan data Ds2 with the high reflection intensity map data Dm2 (step S32). In this instance, the control unit 15 searches for the nearest neighbor point in the high reflection intensity map data Dm2 with respect to each point included in the high reflection intensity scan data Ds2 using any search algorithm such as a KD-Tree.

Next, the control unit 15 constructs first simultaneous equations "Ax-b" which are simultaneous equations for 3D space data (step S33). Here, "x" denotes a parameter vector of the transformation matrix, "b" denotes a vector including, as elements, the inner product of the difference between every pair of associated points between the 3D space map data Dm1 and the 3D space scan data Ds1 and the corresponding normal vector, and "A" denotes a matrix calculated from the 3D space map data Dm1, the 3D space scan data Ds1, and the normal vector. It is noted that the detail of the first simultaneous equations (i.e., simultaneous equations based on P2PL algorithm) is disclosed in Non-Patent Literature 1, for example.

Further, the control unit 15 constructs second simultaneous equations A^ix=b^i which are simultaneous equations for the high reflection intensity data (step S34). Here, "i" denotes an index of the point of the high reflection intensity scan data Ds2, the vector "b^i" denotes a difference vector between the point with the index i of the high reflection intensity scan data Ds2 and the point with the index i of the high reflection intensity map data Dm2, and "A^i" denotes a matrix based on the position coordinates of the point with the index i of the high reflection intensity scan data Ds2. The detail of the second simultaneous equations (i.e., simultaneous equations based on P2P algorithm) is disclosed in Non-Patent Literature 1, for example.

Then, the control unit 15 constructs the integrated simultaneous equations into which the first simultaneous equations and the second simultaneous equations are integrated (step S35). It is noted that the construction of the simultaneous equations in which the simultaneous equations based on P2PL algorithm and the simultaneous equations based on P2P algorithm are integrated is disclosed in Non-Patent Literature 1, for example.

Then, the control unit 15 calculates the solution "Xopt=(α, β, γ, tx, ty, tz)" of the integrated simultaneous equations constructed at step S35 using singular value decomposition or the like (step S36). Then, the control unit 15 calculates the tentative rotation matrix "R_tmp" by using the solution (α, β, γ) of the parameters relating to the rotation around the three axes (step S37). Further, the control unit 15 sets the solution (tx, ty, tz) of the parameters relating to the three axes translation as the tentative translation vector "T_tmp" (step S38). Then, based on the tentative transformation matrix [R_tmp T_tmp] obtained through the process at step S37 and step S38, the control unit 15 generates converted scan data obtained by converting the inputted scan data (i.e., the 3D space scan data Ds1 and the high reflection intensity scan data Ds2) (step S39).

Then, the control unit 15 updates the transformation matrix [R T] based on the tentative transformation matrix [R_tmp T_tmp] calculated in the present loop process (step S40). Specifically, the control unit 15 determines the R after the update to be the product of R_tmp and R before the update, and determines the T after the update to be the sum of T_tmp and the product of R_tmp and T before the update.

Next, the control unit 15 calculates the 3D space squared error "$E_{PT\_PL}$" and the high reflection intensity squared error "$E_{PT\_PT}$" corresponding to the squared error between the point of the converted scan data and the corresponding point of the map data (step S41). Then, the control unit 15 calculates the total error $E_{total}$ which is the weighted sum of the 3D space squared error $E_{PT\_PL}$ and the high reflection intensity squared error $E_{PT\_PT}$ (step S42).

Next, the control unit 15 determines whether or not the loop number counter N_iter is 0) (step S43). Then, if the loop number counter N_iter is 0 (step S43; Yes), i.e., this is the first loop of ICP loop process, the control unit 15 sets the difference "diff_$E_{_total}$" between the total error of the current loop and the total error of the previous loop in this loop as infinity (step S44). On the other hand, if the loop number counter N_iter is not 0 (step S43; Yes), i.e., this is the second or subsequent loop of the ICP loop process, the control unit 15 calculates, as the difference diff_$E_{_total}$, the difference between the total error $E_{_total}$ in the current loop and the total error "Prev_$E_{_total}$" (step S45). Then, the control unit 15 stores (saves) the total error $E_{_total}$ in the current loop as the total error Prev_$E_{_total}$ in the previous loop (step S46). Then, the control unit 15 increments the loop number counter N_iter (step S47).

Then, the control unit 15 makes a determination relating to the termination condition of the ICP loop process (step S48). Specifically, the control unit 15 determines whether or not the difference diff_$E_{_total}$ is greater than the convergence determination threshold value epsilon and the loop number counter N_iter is smaller than the maximum loop number Max_iteration (step S48). If the difference diff_$E_{_total}$ is greater than the convergence determination threshold value epsilon and the loop number counter N_iter is smaller than the maximus loop number Max_iteration (step S48: Yes), the control unit 15 determines that the termination condition of the ICP loop process is not satisfied. Therefore, in this case, the control unit 15 returns the process to step S31. On the other hand, if the difference diff_$E_{_total}$ is smaller than or equal to the convergence determination threshold value epsilon, or if the loop number counter N_iter is equal to or larger than the maximum loop number Max_iteration (step S48; No), the control unit 15 determines that the termination condition of the ICP loop process is satisfied. Therefore, in this case, the control unit 15 ends the ICP loop process.

(3-4) Scan Data Process

Next, a detailed description will be given of the scan data process that is the process to be executed by the scan data processing unit 23 in FIG. 3 and that is the process corresponding to step S15 in FIG. 4.

Figure 7:
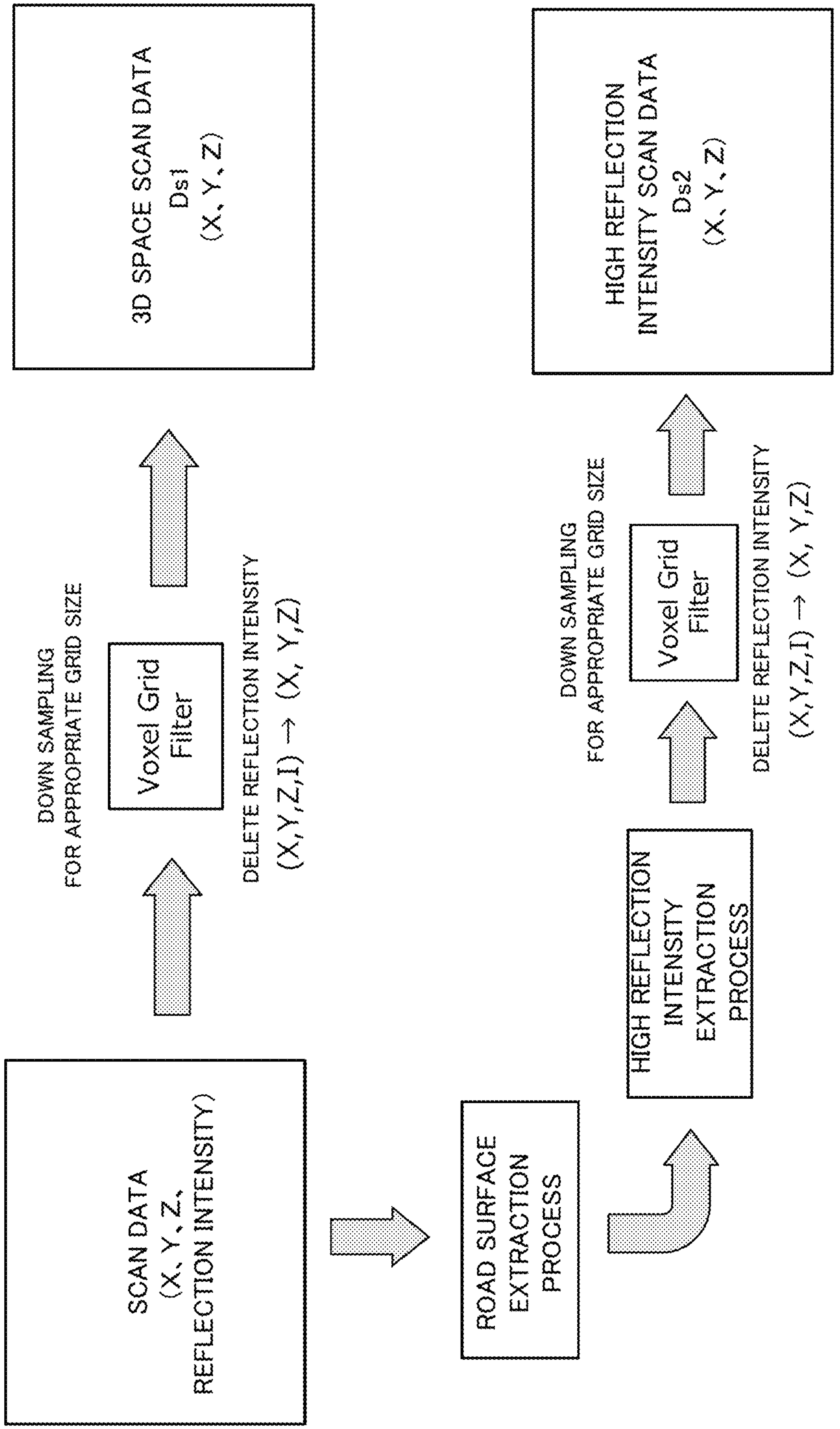
FIG. 7 It is a diagram showing an overview of the scan data process.

FIG. 7 is a diagram showing an outline of the scan data process. FIG. 7 shows the flow of the process of generating 3D space scan data Ds1 and the high reflection intensity scan data Ds2, respectively, from the scan data generated by the lidar 3. Each point of the scan data which the lidar 3 generates includes a coordinate value of the three axes (X,Y,Z) in the lidar coordinate system, and the reflection intensity.

First, the generation of 3D space scan data Ds1 used for the first matching will be described. As shown in FIG. 7, the scan data processing unit 23 applies a decimation process (i.e., down-sampling) such as a Voxel Grid Filter to the scan data so that the scan data has the required grid size, and generates the 3D space scan data Ds1. Further, if not required, the information on the reflection intensity attached to the scan data may be deleted in the 3D space scan data Ds1, or may be left if there is no problem in the process.

Next, the generation of the high reflection intensity scan data Ds2 to be used for the second matching will be described. As shown in FIG. 7, the scan data processing unit 23 generates the high reflection intensity scan data Ds2 by performing a road surface extraction process, a high reflection intensity extraction process, and a decimation process such as a Voxel Grid Filter on the scan data. It will be described in detail below.

Firstly, the scan data processing unit 23 performs a road surface extraction process that is a process of extracting road surface data from the scan data. For example, the scan data processing unit 23 executes the following processes in sequence, as a road surface extraction process.

(a) smoothing by MLS (Moving Least Squares) and calculation of normal lines, (b) filtering in the normal direction, (c) generating a histogram of respective points in terms of height, (d) filtering process in terms of height In the process "(b) filtering in the normal direction", for example, the scan data processing unit 23 performs processing to leave only points whose normal lines calculated in the process (a) are almost vertical (i.e., within a predetermined angle difference from the vertical line). Further, in the process "(c) generating a histogram of respective points in terms of height", the scan data processing unit 23 generates the histogram based on the height components (e.g., Z coordinate values) of the scan data. In the process "(d) filtering process in terms of height", the scan data processing unit 23 extracts each point corresponding to the height of the road surface based on the histogram generated in the process (c). In this case, for example, the scan data processing unit 23 extracts points having the same (or similar) height as the height of the highest frequency in the histogram as the points of the road surface.

Furthermore, the scan data processing unit 23 performs the high reflection intensity extraction process that is a process of extracting points each having a relatively large reflection intensity from the points (also referred to as "road surface candidate points") extracted from the scan data through the road surface extraction process. For example, the scan data processing unit 23 executes the following processes in sequence as the high reflection intensity extraction process.

(e) generating a histogram of the road surface candidate points in terms of the reflection intensity
(f) selecting the reflection intensity threshold value based on the distribution of the histogram
(g) extracting points having the reflection intensity greater than the reflection intensity threshold value Ith
(h) noise-eliminating process such as a SOR (Statistical Outlier Removal)

Figure 8:
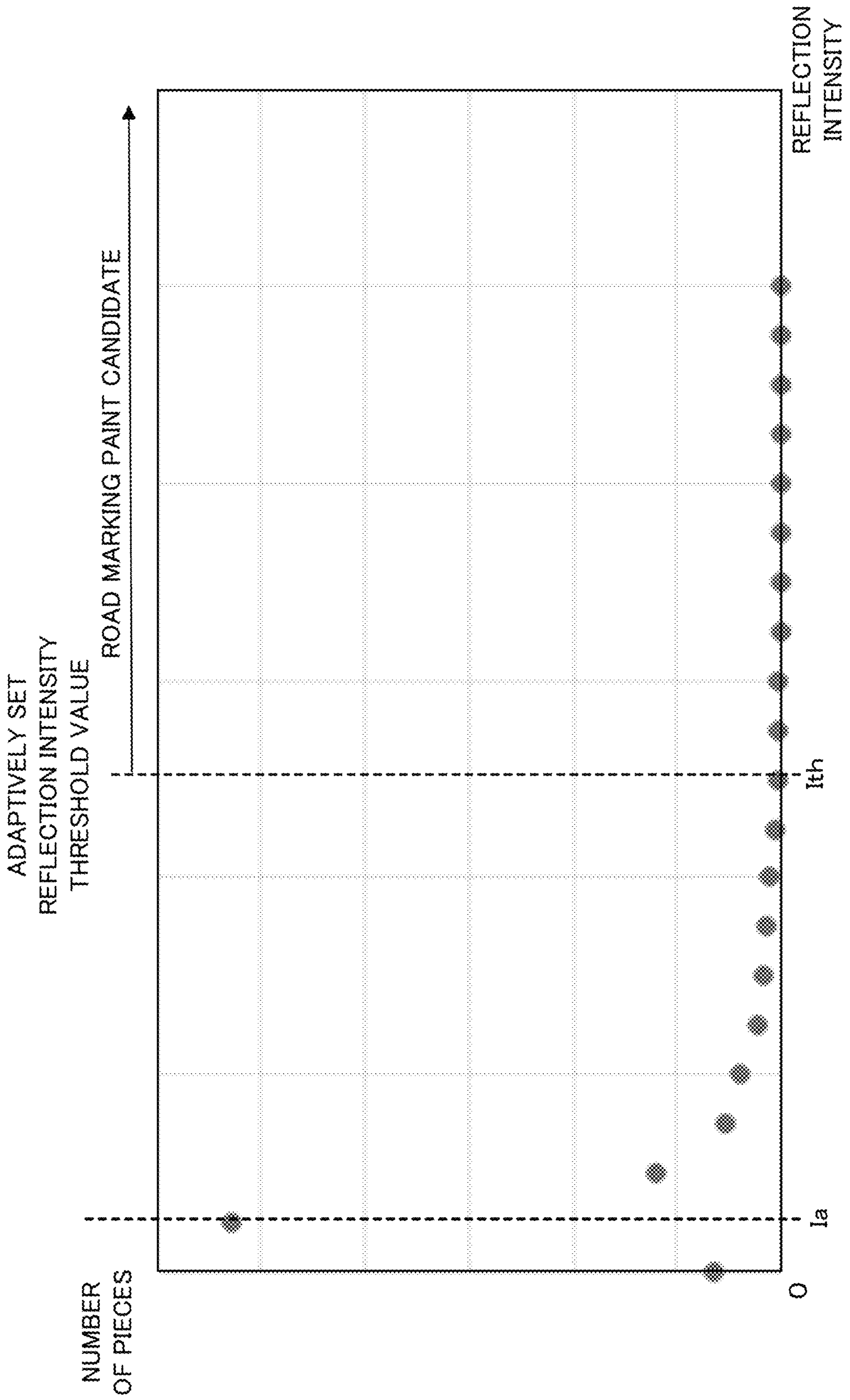
FIG. 8 It is an example of a histogram to be used for setting the reflection intensity threshold value.

FIG. 8 shows an example of a histogram generated in the process "(e) generating a histogram of the road surface candidate points in terms of the reflection intensity". In FIG. 8, the scan data processing unit 23 generates the histogram of the road surface candidate points based on the reflection intensity. Here, the peak in the histogram shown in FIG. 8 is the reflection intensity "Ia". In this instance, the scan data processing unit 23 determines the reflection intensity threshold value "Ith" to be determined in the process (f) on the basis of the reflection intensity Ia that is the peak. For example, the scan data processing unit 23 determines the reflection intensity threshold value Ith to be a value larger than the peak reflection intensity Ia by a predetermined value or a predetermined ratio. In this case, the predetermined value or the predetermined rate described above is, for example, predetermined according to the type of the lidar 3 to be used, and the predetermined value or the predetermined rate is stored in the storage unit 12 so that the scan data processing unit 23 can refer to it. After the reflection intensity threshold Ith is set, in the above-mentioned process (g), the scan data processing unit 23 extracts the road surface candidate points having the reflection intensity value larger than the reflection intensity threshold value Ith as the candidate points of the road marking paint. Thereafter, the scan data processing unit 23 further performs noise removing process such as SOR on the extracted candidate points of the road marking paint in the process (h).

Next, the scan data processing unit 23 performs the decimation process by Voxel Grid Filter or the like on the points extracted by the high reflection intensity extraction process and deletes the information on the reflection intensity from the points as required. Thus, the scan data processing unit 23 generates the high reflection intensity scan data Ds2 configured by the points on the road surface each having a high reflection intensity.

It is noted that the scan data processing needs to be performed in real time depending on the system to be applied. For example, it is true when it is applied to a real-time self-position and posture estimation. It is not true for the case where the real-time performance is not required such as map generation by offline SLAM (Simultaneous Localization and Mapping).

(3-5) Map Data Process

Next, detailed description will be given of the map data process that is a generation process of the 3D space map data Dm1 and the high reflection intensity map data Dm2 which the map data processing unit 20 in FIG. 3 executes.

Figure 9:
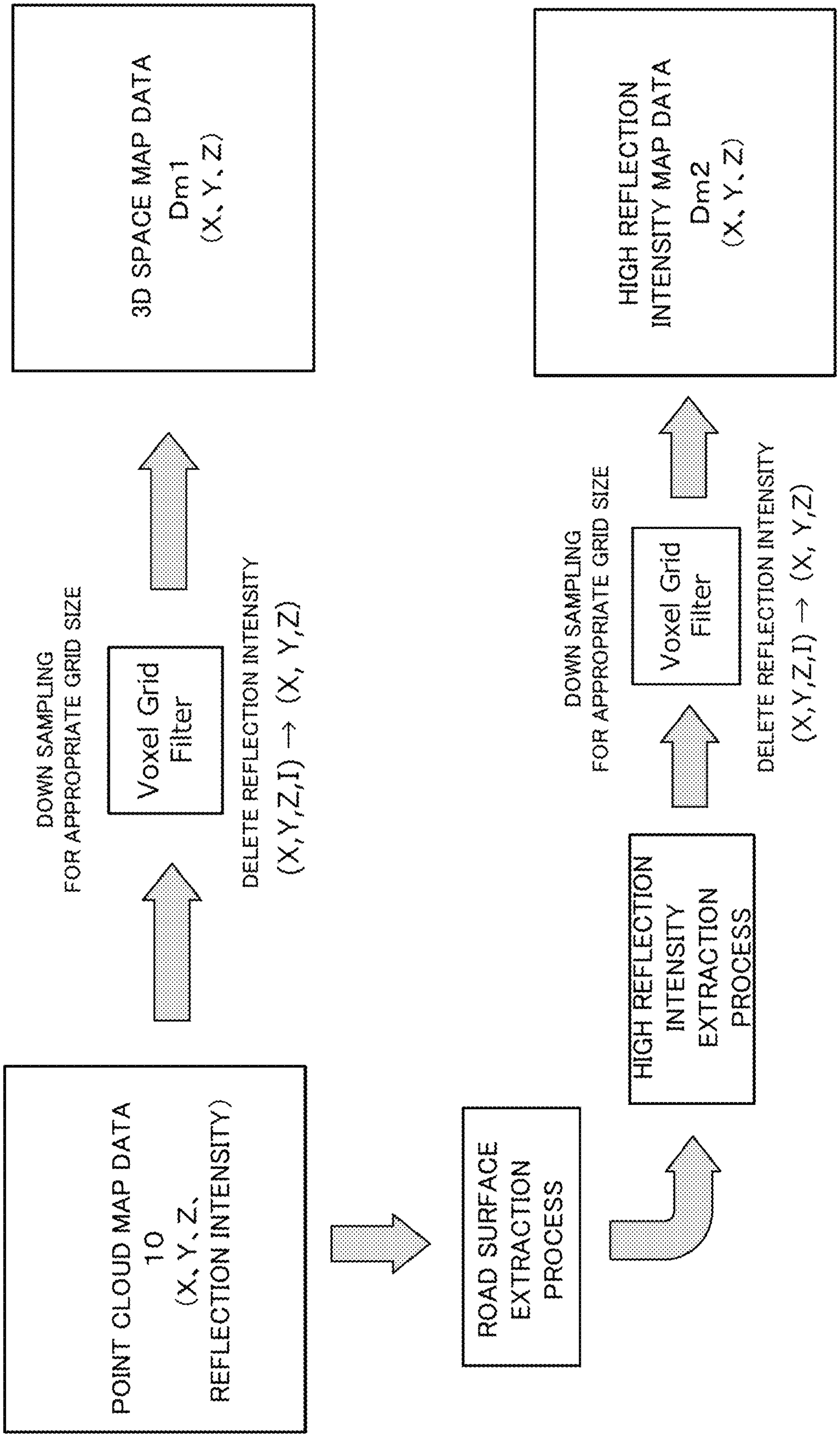
FIG. 9 It is a diagram showing an overview of the map data process.

FIG. 9 is a diagram showing an outline of the map data process. FIG. 9 shows the flow of the process of generating 3D space map data Dm1 and the high reflection intensity map data Dm2, respectively, from the point cloud map data 10. Each point constituting the point cloud map data 10 includes a coordinate value of the three axes (X,Y,Z) in the lidar coordinate system, and the reflection intensity.

First, the generation of the 3D space map data Dm1 used for the first matching will be described. As shown in FIG. 9, the map data processing unit 20 applies a decimation process (i.e., down-sampling) such as a Voxel Grid Filter to the point cloud map data 10 so that the map data has the required grid size, and generates the 3D space map data Dm1. Further, if not required, the information on the reflection intensity attached to the map data may be deleted in the 3D space map data Dm1, or may be left if there is no problem in the process.

Next, the generation of the high reflection intensity map data Dm2 for use in the second matching will be described. As shown in FIG. 9, the scan data processing unit 23 generates the high reflection intensity map data Dm2 by performing a road surface extraction process, a high reflection intensity extraction process, and a decimation process such as a Voxel Grid Filter on the point cloud map data 10. It will be described in detail below.

The scan data processing unit 23 firstly performs a road surface extraction process that is a process of extracting road surface data from the point cloud map data 10. For example, the map data processing unit 20 performs, as the road surface extraction process, the following processes in sequence.

(i) smoothing by MLS and calculation of normal lines,
(j) filtering in the normal direction,
(k) clustering
(l) extracting cluster corresponding to road surface The processes (i) and (j) are the same processes as the processes (a) and (b) described in the section "(3-4) Scan Data Process". In the process "(k) clustering", the map data processing unit 20 executes any clustering method in terms of at least height to thereby generate a plurality of clusters each of which is a set of points having similar heights. Then, in the process "(l) extracting cluster corresponding to road surface", for example, the map data processing unit 20 determines the noise data (including a planar portion of the center median of the road) to be one or more clusters whose number of points is less than a predetermined threshold value and deletes the one or more clusters.

Furthermore, the map data processing unit 20 performs the high reflection intensity extraction process that is a process of extracting points which have relatively high reflection intensity from the road surface candidate points that are extracted by the road surface extraction process from the point cloud map data 10. For example, the scan data processing unit 23 performs, as a high reflection intensity extraction process, the following processes in sequence.

(m) generating a histogram of the road surface candidate points in terms of the reflection intensity
(n) selecting the reflection intensity threshold value based on the distribution of the histogram
(o) extracting points having the reflection intensity greater than the reflection intensity threshold value Ith The processes (m) to (o) are, for example, the same as the processes (e) to (g) described in the section "(3-4) Scan data process".

Next, the map data processing unit 20 performs the decimation process by Voxel Grid Filter or the like on the points extracted by the high reflection intensity extraction process and deletes the information on the reflection intensity from the points as required. Accordingly, the map data processing unit 20 generates the high reflection intensity map data Dm2.

It is noted that the case to which the map data process by the map data processing unit 20 is applied is not necessarily limited to the case of performing real-time processing. Alternatively, the in-vehicle device 1 may store the 3D space map data Dm1 and the high reflection intensity map data Dm2 generated in advance by offline process in the storage unit 12 or the like so as to be read by the control unit 15 at step S11 in FIG. 4.

(4) Technical Effect

Next, a description will be given of the technical effect of this embodiment.

As the first effect, utilization of road marking paint is mentioned. In the present embodiment, the in-vehicle device 1 performs matching based on ICP by utilizing both the three-dimensional space data and the high reflection intensity data indicating the road marking paint. On the other hand, in a common ICP, matching is performed using only the shape information (only three-dimensional coordinate values) of an object. Therefore, even if there is a road marking paint with a characteristic shape on the road surface, the road marking paint is not utilized. Taking the above into consideration, in the present embodiment, the in-vehicle device 1 prepares the 3D space map data Dm1 and the high reflection intensity map data Dm2 and performs matching for the three-dimensional space and matching for the road marking paint. Accordingly, it is possible to suitably execute the ICP utilizing the road marking paint with the characteristic shape.

As the second effect, the matching of the road marking paint independent of the "magnitude" of the reflection intensity value is mentioned. In general, the value of the reflection intensity in the scan data varies depending on the distance, the incident angle, and the like even for the same measurement object. Therefore, to use the reflection intensity value itself, so as not to depend on the distance, the incident angle, and the like, it is necessary to perform a highly accurate calibration. In view of the above, in the present embodiment, instead of using the value itself of the reflection intensity, the vehicle machine performs the threshold process using the reflection intensity threshold value thereby to extract the points of the road marking paint with high reflection intensity. Thus, the in-vehicle device 1 can perform the matching process using the three-dimensional coordinate value of the road marking paint with high reflection intensity while avoiding the use of the reflection intensity value itself.

As the third effect, is the implementation of high precision matching by using the P2P algorithm for the matching (i.e., second matching) of the road marking paint. It is known that the P2PL algorithm is superior to the P2P algorithm in terms of high accuracy matching for a common three-dimensional space. However, for reasons described below, the P2PL algorithm is considered to be inappropriate for the matching of the road marking paint on a road surface. Taking the above into consideration, in the present embodiment, the in-vehicle device 1 performs the Combined ICP algorithm in which the first matching that is the matching of the three-dimensional space is performed with the evaluation index of the P2PL algorithm and the second matching that is the matching of the road marking paint is performed with the evaluation index of the P2P algorithm. Thus, the in-vehicle device 1 can perform the matching with high accuracy.

Here, the reason the P2PL algorithm is inappropriate in the matching of the road marking paint on the road surface will be explained. If the corresponding points to be matched are on the road plane, the vectors connecting those points and the normal vector of the road plane become perpendicular to each other and therefore the P2PL evaluation index becomes zero. Therefore, it cannot be detected that the corresponding points are deviated from each other. Specifically, in the ICP loop process, assuming that the scan data is filtered to have heights that approximately matches the road plane (in this case, the rest is the matching in the lateral direction), the vector of the corresponding points between the source that is the high reflection intensity scan data Ds2 and the target that is the high reflection intensity map data Dm2 is oriented approximately parallel to the road surface. Since, in the PTPL algorithm, the evaluation function corresponding to the sum of the inner product of the vector connecting the corresponding points and the normal vector of the point of the target that is the high reflection intensity map data Dm2 is minimized, the evaluation function becomes almost zero. Therefore, in the PTPL algorithm after the matching with respect to the Z direction of the plane is substantially completed, it will be impossible to detect the deviation in the lateral direction (X, Y directions). Taking the above into consideration, the in-vehicle device 1 performs the second matching, which is the matching of the road marking paint, using the evaluation index of the P2P algorithm.

Next, a description will be given of the simulation results based on the approach according to the embodiment.

Figure 10:
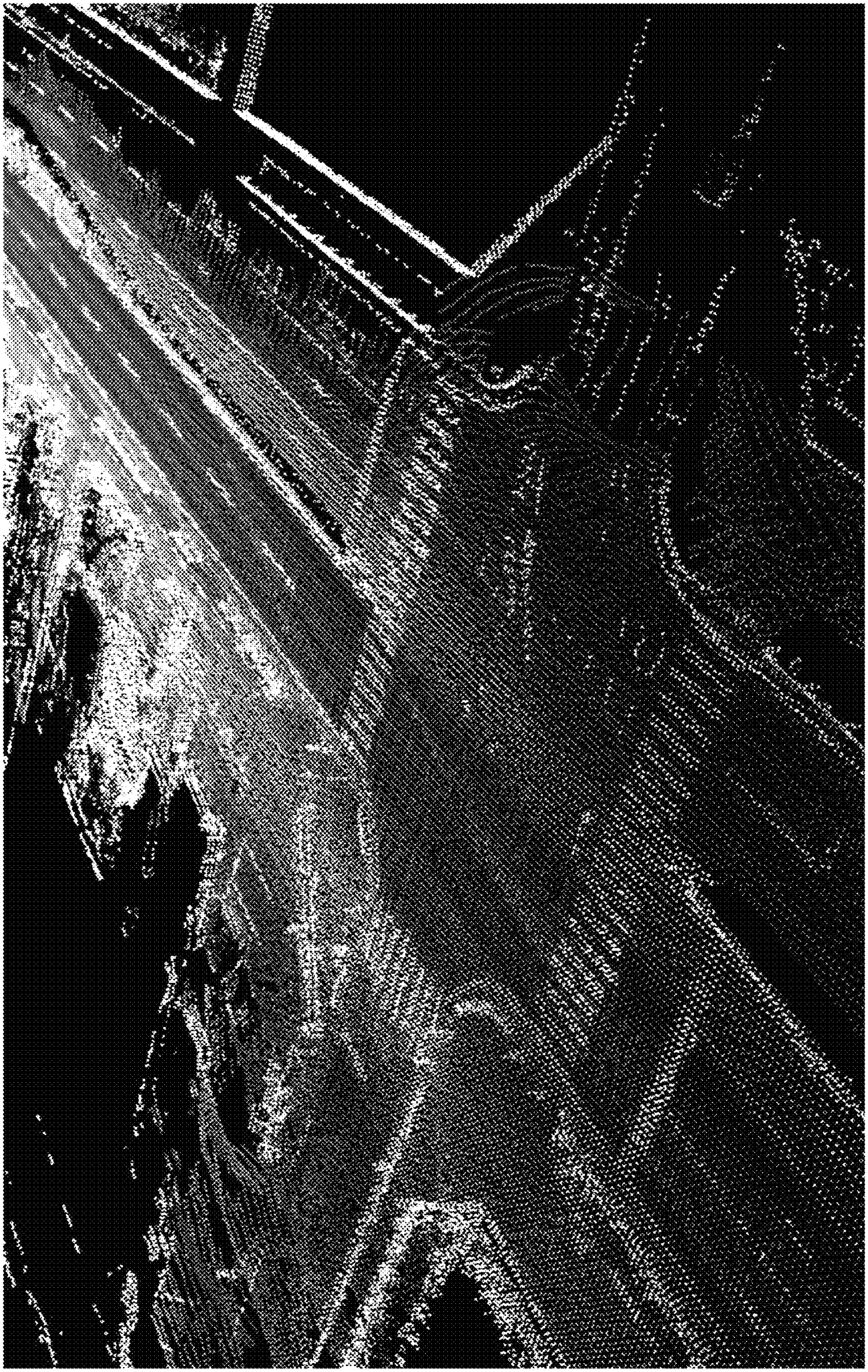
FIG. 10 It is a perspective view showing point cloud map data, to be used in the simulation, whose each point is plotted on the three-dimensional space.

FIG. 10 is a perspective view showing a state, in the three-dimensional space, of plotted points of the point cloud map data 10 used in the present simulation. In FIG. 10, the higher the reflection intensity of a point is, the closer to white the point is displayed. As shown in FIG. 10, the reflection intensity of the road marking paint such as white line is relatively high. In this simulation, the point cloud map data 10 and the scan data obtained by deleting points having the height equal to or larger than 70 cm from the ground are used. This assumes a condition in which there are few structures (guardrail, if any) in the circumference.

Figure 11:
FIG. 11 It is a diagram showing a matching result in the comparative example.

FIG. 11 shows the matching results of a comparative example for comparison with the method based on the present embodiment. In the comparative example, the transformation matrix is calculated based on the first matching without using the second matching and the matching is performed between the 3D space map data Dm1 and the 3D space scan data Ds1 by the P2PL algorithm. In FIG. 11, the points of the 3D space scan data Ds1 after conversion based on the matching result are indicated in white, and the points of the point cloud map data 10 are indicated in gray (thin white). In this case, in the range shown in the circle 70, misalignment (vertical misalignment, slight rotational deviation in the counterclockwise direction) is observed.

Figure 12:
FIG. 12 It is a diagram showing a matching result by the matching method according to the present embodiment.

FIG. 12 is a diagram showing the matching result according to the matching method (i.e., according to Combined ICP algorithm) based on the present embodiment. In FIG. 12, the points of the scan data converted based on the matching result is indicated in white, the points of the point cloud map data 10 is indicated in gray (thin white). As shown in FIG. 12, in this case, the scan data converted by the matching method based on the present embodiment has almost no deviation from the point cloud map data 10, and therefore it can be grasped that a good matching result is obtained.

Figure 13:
FIG. 13 It is a diagram showing individual results regarding the second matching.

FIG. 13 is a diagram illustrating a matching result between the high reflection intensity map data Dm2 and the high reflection intensity scan data Ds2 by P2P algorithm when the matching method according to the present embodiment is executed. In FIG. 13, the points of the high reflection intensity scan data Ds2 converted based on the matching result are shown in white, and the high reflection intensity map data Dm2 are shown in gray (thin white). As shown in FIG. 13, the high reflection intensity scan data Ds2 converted based on the matching method according to the present embodiment has little deviation from the high reflection intensity map data Dm2, and therefore it can be understood that a good matching result is obtained.

Figure 14:
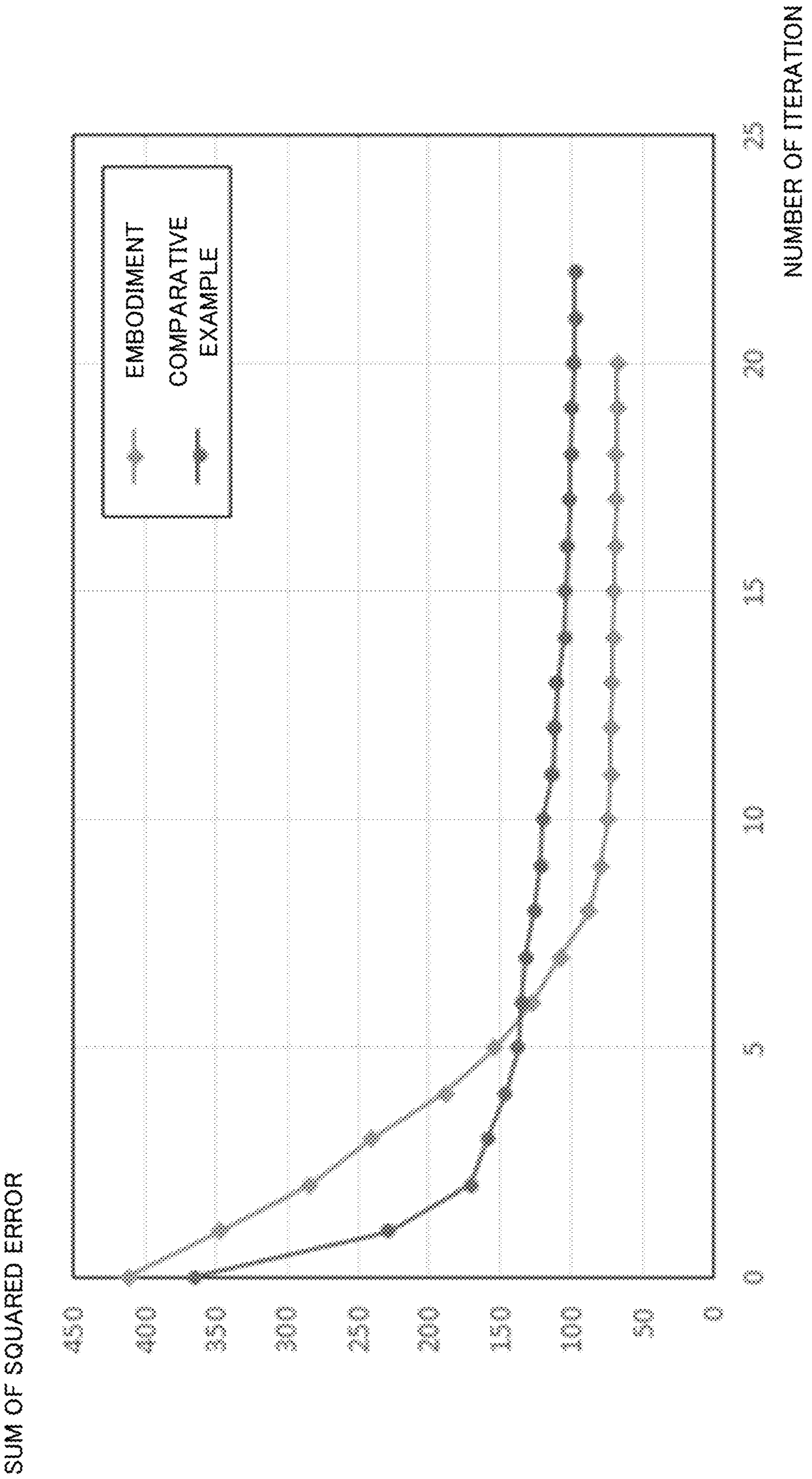
FIG. 14 It illustrates graphs showing the relation between the number of iterations and the squared error regarding the ICP loop process when the approach according to the embodiment and the approach according to the comparative example are respectively performed.

FIG. 14 is a graphical representation of the relation between the number of iterations of the ICP loop process and the squared error when the approach (i.e., Combined ICP algorithm) according to the embodiment and the approach (i.e., P2PL algorithm) according to the comparative example are performed. As shown in FIG. 14, as the number of iterations of the ICP loop process increases, it can be seen that the error of the approach according to the embodiment is smaller than that of the approach according to the comparative example. Further, when the error of the approach according to the comparative example and the error of the approach according to the embodiment are compared per point (measurement point), the former error becomes "0.12 m" (the number of points is 6706) and the latter error becomes "0.10 m" (the number of points is 6711). As described above, the approach according to the embodiment is able to utilize the shape of the road marking paint as a feature at the time of matching. Accordingly, it is possible to perform the matching even when there were few surrounding structures in the space, and as a result, it is considered that the approach according to the embodiment is superior to the approach according to the comparative example in which only P2PL algorithm is adopted.

(5) Modifications

Hereinafter, a description will be given of preferred modifications to be applied to the above-described embodiment. The following modifications may be applied to the embodiment in any combination.

First Modification

The control unit 15 may use different grid sizes per point (i.e., the grid size defined in the Voxel Grid Filer) of the data in the first matching and the second matching. Thereby, it is possible to adjust the balance between the processing time and the accuracy. For example, by making the grid size of the high reflection intensity scan data Ds2 and the high reflection intensity map data Dm2 used for the second matching smaller than the grid size of the 3D space scan data Ds1 and the 3D space map data Dm1 used for the first matching, the matching result with emphasis on the second matching can be obtained.

Second Modification

The control unit 15 may correct the reflection intensity included in the scan data outputted by the lidar 3 in accordance with the measurement direction or/and the measurement distance.

In this case, for example, the control unit 15 stores a look-up table or the like indicating an appropriate correction amount for each measurement direction and measurement distance in advance in the storage unit 12. Then, with reference to the look-up table or the like, the control unit 15 corrects the reflection intensity of each point of the scan data outputted by the lidar 3 in accordance with the corresponding measurement direction or/and measurement distance. Thus, the control unit 15 can perform the matching according to the present embodiment based on the scan data including information on more accurate reflection intensity.

Third Modification

In the second matching based on the high reflection intensity scan data Ds2 and the high reflection intensity map data Dm2, the control unit 15 may perform the matching based on not only the road marking paint but also any other feature having a high reflection intensity as a reference.

In this instance, the high reflection intensity scan data Ds2 and the high reflection intensity map data Dm2 include, in addition to points of road marking paints, points of signs regarding directions, guardrails, and surfaces of any other features that have been painted with high reflection intensity (including concrete walls at road borders, walls inside tunnels). In this case, in the generation process of the high reflection intensity scan data Ds2 and the high reflection intensity map data Dm2, the control unit 15 performs not only the process of extracting the points of the road marking paint shown in FIGS. 7 and 9 but also the process of extracting the above-mentioned points with high reflection intensity. In this case, the control unit 15 performs, as the latter process, for example, a process of extracting a reference surface on which the points with high reflection intensity are present (i.e., road surface extraction process in road marking paint), and the high reflection intensity extraction process. Thereby, the control unit 15 extracts, from the scan data and the point cloud map data 10, the points of the features with high reflection intensity.

According to this modification, the control unit 15 utilizes points (high reflection intensity data) with high reflection intensity including a road marking paint, it is possible to suitably improve the matching accuracy. In this modification, the road surface and the surface of the feature painted with high reflection intensity is an example of the "reference surface".

Fourth Modification

The control unit 15 may determine the reflection intensity threshold value, which is used in the map data processing unit 20 and the scan data processing unit 23, to be a predetermined value stored in advance in the storage unit 12, instead of adaptively determining it according to the histogram. In this case, the predetermined value described above is, for example, predetermined to be a value higher than the reflection intensity of the road surface other than the road marking paint and less than the reflection intensity of the road marking paint, and it is stored in the storage unit 12.

Fifth Modification

The control unit 15 may perform only the second matching instead of performing Combined ICP algorithm in which the first matching and the second matching are combined. In this instance, the control unit 15 calculates the transformation matrix by matching the high reflection intensity scan data Ds2 to the high reflection intensity map data Dm2 based on the P2P algorithm. Even in an environment in which there are few objects having a three-dimensional structure, the control unit 15 in this case can suitably execute the matching between the map data and the scan data.

Sixth Modification

The configuration of the driving support system shown in FIG. 1 is an example, and the configuration of the driving support system to which the present invention can be applied is not limited to the configuration shown in FIG. 1. For example, instead of the on-vehicle device 1 being provided in the driving support system, the electronic control unit of the vehicle may perform the processes indicated by the block diagram shown in FIG. 3. In this case, for example, the point cloud map data 10 is stored in the storage unit of the vehicle or in the server device configured to perform data communication with the vehicle. The electronic control device of the vehicle executes such matching process of the scan data outputted by the lidar 3 by referring to the point cloud map data 10.

As described above, the information processing device according to the present embodiment includes a point cloud map data acquisition unit, a scan data acquisition unit, a scan data processing unit, and a matching unit. The point cloud map data acquisition unit is configured to acquire point cloud map data that is point cloud data whose reflection intensity is equal to or larger than a threshold value. The scan data acquisition unit is configured to acquire scan data that is point cloud data measured by receiving reflected light of emitted light. The scan data processing unit is configured to generate, from the scan data, high reflection intensity scan data whose reflection intensity is equal to or larger than a predetermined threshold value. The matching unit is configured to perform matching between the point cloud map data and the high reflection intensity scan data. Thus, the information processing device can suitably execute the matching between the map data and the scan data even in an environment in which there are few objects having a three-dimensional structure.

While the present invention has been described with reference to the embodiments, the present invention is not limited to the above embodiments. Various modifications that can be understood by a person skilled in the art can be made to the configuration and details of the present invention within the scope of the present invention. Namely, the present invention includes, of course, various modifications that may be made by a person skilled in the art according to the entire disclosure including claims and technical ideas. In addition, all Patent and Non-Patent Literatures mentioned in this specification are incorporated by reference in its entirety.

1 In-vehicle device
2 Sensor group
3 Lidar
4 GPS receiver
5 Gyroscope sensor
6 Vehicle velocity sensor
10 Point cloud map data

What is claimed is:

1. An information processing device comprising:

a processor coupled to a memory storing instructions for the processor to function as:

a point cloud map data acquisition unit configured to acquire point cloud map data which includes:

high reflection intensity map data that is point cloud data including points, on a reference plane, whose reflection intensity is equal to or larger than a first threshold value and which represents road marking paint; and three-dimensional space map data that is point cloud data of features existing in a three-dimensional space;

a scan data acquisition unit configured to acquire scan data that is point cloud data measured by a lidar of a vehicle which receives reflected light of emitted light;

a scan data processing unit configured to:

generate, from the scan data, high reflection intensity scan data including points, on the reference plane, whose reflection intensity is equal to or larger than a second threshold value and which represents the road marking paint, wherein the scan data processing unit is configured to identify a peak reflection intensity from a histogram of the scan data and set the second threshold value based on the identified peak reflection intensity for each frame of the scan data, generate the scan data or data obtained by filtering the scan data as three-dimensional space scan data;

a matching unit configured to perform:

a first matching between the three-dimensional space map data and the three-dimensional space scan data; and a second matching between the high reflection intensity map data and the high reflection intensity scan data, wherein the first threshold value is different from the second threshold value;

a position estimation unit configured to estimate a position of the vehicle based on results of the first matching and the second matching; and a vehicle control unit configured to control the vehicle based on the estimated position.

2. The information processing device according to claim 1, wherein the matching unit is configured to perform the matching in one of the first matching and the second matching based on a Point to Point algorithm.

3. The information processing device according to claim 1, wherein the matching unit is configured to perform the first matching based on a Point to Plane algorithm and performs the second matching based on a Point to Point algorithm.

4. The information processing device according to claim 1, wherein the matching unit is configured to set weights for the first matching and the second matching based on:

a number of matched points of the three-dimensional space scan data in the first matching and a number of matched points of the high reflection intensity scan data in the second matching.

5. The information processing device according to claim 1, wherein the reference plane includes a road surface.

6. The information processing device according to claim 1, wherein the scan data acquisition unit is configured to acquire the scan data measured by a sensor that receives the reflected light of the light emitted therefrom.

7. The information processing device according to claim 1, wherein the matching unit is configured to calculate a parameter for converting a coordinate system of the scan data into a coordinate system of the point cloud map data.

8. The information processing device according to claim 1, wherein the point cloud map data acquisition unit is configured to set the first threshold value based on a histogram of the point cloud map data in terms of the reflection intensity.

9. The information processing device according to claim 1, wherein the point cloud map data acquisition unit is configured to make a first histogram of reflection intensities of point cloud map data, which indicate a three-dimensional position and a reflection intensity for each point, and set the first threshold value based on the first histogram, and wherein the scan data processing unit is configured to make a second histogram of the reflection intensities of the scan data, which indicate a three-dimensional position and a reflection intensity for each point, and set the second threshold value based on the second histogram.

10. A control method executed by a computer, the control method comprising:

acquiring point cloud map data which includes:

high reflection intensity map data that is point cloud data including points, on a reference plane, whose reflection intensity is equal to or lamer than a first threshold value and which represents road marking paint; and three-dimensional space map data that is point cloud data of features existing in a three-dimensional space, acquiring scan data that is point cloud data measured by a lidar of a vehicle which receives reflected light of emitted light;

generating, from the scan data, high reflection intensity scan data including points, on the reference plane, whose reflection intensity is equal to or larger than a second threshold value and which represents the road marking paint, wherein the acquiring scan data includes identifying a peak reflection intensity from a histogram of the scan data and set the second threshold value based on the identified peak reflection intensity for each frame of the scan data;

generating the scan data or data obtained by filtering the scan data as three-dimensional space scan data; and performing:

a first matching between the three-dimensional space map data and the three-dimensional space scan data; and a second matching between the high reflection intensity map data and the high reflection intensity scan, wherein the first threshold value is different from the second threshold value; and estimating a position of the vehicle based on results of the first matching and the second matching; and controlling the vehicle based on the estimated position.

11. A non-transitory computer readable medium storing a program executed by a computer, the program causing the computer to:

acquire point cloud map data which includes:

high reflection intensity map data that is point cloud data including points, on a reference plane, whose reflection intensity is equal to or lamer than a first threshold value and which represents road marking paint; an three-dimensional space map data that is point cloud data of features existing in a three-dimensional space, acquire scan data that is point cloud data measured by a lidar of a vehicle which receives reflected light of emitted light;

generate, from the scan data, high reflection intensity scan data including points, on the reference plane, whose reflection intensity is equal to or larger than a second threshold value and which represents the road marking paint, wherein the acquiring scan data includes identifying a peak reflection intensity from a histogram of the scan data and set the second threshold value based on the identified peak reflection intensity for each frame of the scan data;

generate the scan data or data obtained by filtering the scan data as three-dimensional space scan data; and perform:

a first matching between the three-dimensional space map data and the three-dimensional space scan data; and a second matching between the high reflection intensity map data and the high reflection intensity scan, wherein the first threshold value is different from the second threshold value; and estimating a position of the vehicle based on results of the first matching and the second matching; and controlling the vehicle based on the estimated position.

* * * * *